United States Patent
Li

(10) Patent No.: US 10,659,927 B2
(45) Date of Patent: *May 19, 2020

(54) SIGNAL TRANSMISSION METHOD AND APPARATUS

(71) Applicant: Huawei Technologies Co., Ltd., Shenzhen (CN)

(72) Inventor: Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,443

(22) Filed: Dec. 20, 2018

(65) Prior Publication Data

US 2019/0124478 A1  Apr. 25, 2019

Related U.S. Application Data

(63) Continuation of application No. 15/349,733, filed on Nov. 11, 2016, now Pat. No. 10,200,827, which is a (Continued)

(51) Int. Cl.
*H04W 4/06* (2009.01)
*H04W 72/04* (2009.01)
(Continued)

(52) U.S. Cl.
CPC .............. *H04W 4/06* (2013.01); *H04L 12/18* (2013.01); *H04L 27/3488* (2013.01); (Continued)

(58) Field of Classification Search
CPC ... H04W 4/06; H04W 72/042; H04W 72/005; H04W 88/02; H04L 12/18; H04L 27/3488
See application file for complete search history.

(56) References Cited

U.S. PATENT DOCUMENTS

2007/0004415 A1* 1/2007 Abedi ................... H04W 36/18
                                                                    455/442
2009/0149164 A1   6/2009 Cai
(Continued)

FOREIGN PATENT DOCUMENTS

CN       1853437 A    10/2006
CN     101425915 A     5/2009
(Continued)

OTHER PUBLICATIONS

Motorola Mobility, Change Request to Rel-12 LTE-Advanced features in 36.213, 3GPP TSG-RAN WG1 Meeting #76-BIS, Shenzhen, China, Mar. 31-Apr. 4, 2014, R1-141736. (Year: 2014).*
(Continued)

*Primary Examiner* — Shailendra Kumar
(74) *Attorney, Agent, or Firm* — Leydig, Voit & Mayer, Ltd.

(57) ABSTRACT

A signal transmission method and apparatus are provided. The signal transmission method provided in embodiments of the present invention includes: determining a modulation type of service data that needs to be transmitted, where the modulation type includes hierarchical modulation and non-hierarchical modulation; modulating, by means of the hierarchical modulation when it is determined that the modulation type is the hierarchical modulation, the service data that needs to be transmitted, and sending a modulated hierarchical modulation signal to UE; and sending modulation configuration information to the UE, where the modulation configuration information includes information used to indicate the modulation type. By using the embodiments of the present invention, the system spectrum utilization efficiency and the system throughput can be greatly improved.

20 Claims, 3 Drawing Sheets

S501
A network side device determines a modulation type of service data that needs to be transmitted, where the modulation type includes hierarchical modulation and non-hierarchical modulation S502
The network side device modulates, by means of the hierarchical modulation when determining that the modulation type is the hierarchical modulation, the service data that needs to be transmitted, sends a modulated hierarchical modulation signal to UE, and sends modulation configuration information to the UE, so that the UE demodulates the received hierarchical modulation signal according to the modulation configuration information, where the modulation configuration information includes information used to indicate the modulation type

Related U.S. Application Data continuation of application No. PCT/CN2014/077456, filed on May 14, 2014.

(51) Int. Cl.

| | | |
|---|---|---|
| *H04L 27/34* | (2006.01) | |
| *H04L 12/18* | (2006.01) | |
| *H04W 72/00* | (2009.01) | |
| *H04L 5/00* | (2006.01) | |
| *H04W 88/02* | (2009.01) | |

(52) U.S. Cl.
CPC ....... *H04W 72/005* (2013.01); *H04W 72/042* (2013.01); *H04L 5/0091* (2013.01); *H04W 88/02* (2013.01)

(56) References Cited

U.S. PATENT DOCUMENTS

| | | | |
|---|---|---|---|
| 2010/0284319 A1 | 11/2010 | Wang et al. | |
| 2012/0213186 A1 | 8/2012 | Ng et al. | |
| 2012/0257562 A1* | 10/2012 | Kim ..................... | H04W 4/06 370/312 |
| 2013/0128796 A1* | 5/2013 | Newberg ............. | H04L 1/0003 370/312 |
| 2014/0198707 A1* | 7/2014 | Wang ................... | H04W 4/70 370/312 |
| 2014/0321345 A1 | 10/2014 | Li et al. | |
| 2015/0230210 A1 | 8/2015 | Lee et al. | |

FOREIGN PATENT DOCUMENTS

| | | | |
|---|---|---|---|
| CN | 101465829 A | | 6/2009 |
| CN | 101707584 A | | 5/2010 |
| CN | 101897202 A | | 11/2010 |
| CN | 102036184 A | | 4/2011 |
| CN | 102104833 A | | 6/2011 |
| CN | 102823278 A | | 12/2012 |
| CN | 102957498 A | * | 3/2013 |
| CN | 103001756 A | | 3/2013 |
| CN | 103178870 A | | 6/2013 |
| EP | 2811793 A1 | | 12/2014 |
| JP | 2010527526 A | | 8/2010 |
| JP | 2010219949 A | | 9/2010 |
| JP | 2011019273 A | | 1/2011 |
| JP | 2013509739 A | | 3/2013 |
| JP | 2013509741 A | | 3/2013 |
| WO | 2011026235 A1 | | 3/2011 |
| WO | WO 2011/026235 A1 | * | 3/2011 |
| WO | 2013113151 A1 | | 8/2013 |
| WO | 2013139036 A1 | | 9/2013 |

OTHER PUBLICATIONS

Lucent Technologies, MBMS Power Usage, 3GPP TSG RAN WG2 #31, Aug. 18-23, 2002, Stockholm, Sweden, R2-022110. (Year: 2002).*

Motorola, Supporting Differentiated Quality to Mobile Multimedia Devices using Scalable MBMS, 3GPP Joint TSG-RAN WG 2 and WG3 MBMS Meeting, Wokingham, Berkshire, UK, Jan. 15-16, 2003, R2-030055. (Year: 2003).*

"Supporting Differentiated Quality in Mobile Multimedia Devices using Scalable MBMS," 3PP Joint TSG-RAN WG2 and WG3 MBMS Meeting, Wokingham, Berkshire, Tdoc R2-030055, pp. 1-7, 3rd Generation Partnership Project,Valbonne, France (Jan. 15-16, 2003).

"Hierarchical Modulation based DL MIMO for LTE-Advanced," 3GPP TSG-RAN1 #58bis, R1-094250, 3rd Generation Partnership Project, Valbonne, France (Oct. 12-16, 2009).

"Introduction of Rel-12 LTE-Advanced features in 36.213", 3GPP Draft, R 1-141736, 3rd Generation Partnership Project, Valbonne, France (Mar. 31-Apr. 4, 2014).

"3rd Generation Partnership Project; Technical Specification Group Radio Access Network; Evolved Universal Terrestrial Radio Access (E-UTRA); Physical layer procedures (Release 12)," 3GPP TS 36.213, pp. 1-186, 3rd Generation Partnership Project, Valbonne, France (Mar. 2014).

Morimoto et al., "A Study on a Hierarchical Image Transmission System in a Rayleigh Fading Channel," Technical report of the Institute of Electronics, Information and Communication Engineers, pp. 2-8, RCS96-22, Institute of Electrical and Electronics Engineers, New York, New York (May 1996).

"Correction on the ratio of POSCH EPRE to CRS EPRE for TM10," 3GPP TSG-RAN WG1 #74 Barcelona, Spain, R1-133809, 3rd Generation Partnership Project, Valbonne, France (Aug. 20-24, 2013).

"Details of CQI definition for LTE-A," 3GPP TSG-RAN WG1 #63 Jacksonville, USA, R1-106034, 3rd Generation Dartnership Project, Valbonne, France (Nov. 15-19, 2010).

"MBMS Power Usage," R2-022110, 3GPP TSG RAN WG2 #31, Stockholm, Sweden, 3rd Generation Partnership Project, Valbonne, France (Aug. 18-23, 2002).

* cited by examiner

SIGNAL TRANSMISSION METHOD AND APPARATUS

CROSS-REFERENCE TO RELATED APPLICATIONS

This application is a continuation of U.S. application Ser. No. 15/349,733, filed on Nov. 11, 2016, which is a continuation of International Application No. PCT/CN2014/077456, filed on May 14, 2014. All of the afore-mentioned patent applications are hereby incorporated by reference in their entireties.

TECHNICAL FIELD

Embodiments of the present invention relate to the field of communications technologies, and in particular, to a signal transmission method and apparatus.

BACKGROUND

MBMS (Multimedia Broadcast Multicast Service) is used to provide a multimedia broadcast service and a multimedia multicast service for user equipment (UE) in a cell. The multimedia broadcast service may broadcast multimedia video information to all UEs. The multimedia multicast service may send some paid multimedia video information to a group of subscribed UEs for watching.

In an LTE (Long Term Evolution) system, when an MBMS mode is used to transmit a physical multicast channel (PMCH), a network side device transmits, on an MBMS point-to-multipoint control channel (MCCH), a modulation and coding scheme (MCS) index for an MBMS point-to-multipoint traffic channel (MTCH). Different MCS indexes correspond to different MCS configuration information. The configuration information includes a modulation scheme used when a transmitted MTCH is modulated and encoded, such as quadrature phase shift keying (QPSK) modulation, 16 quadrature amplitude modulation (QAM), or 64 QAM. A UE demodulates the received MTCH according to the configuration information.

Because of relatively poor environment quality (a relatively low signal-to-noise ratio) of a channel between cell-edge UE and a base station, to ensure service transmission robustness, when service data is transmitted to the cell-edge UE, a low-order modulation and coding scheme such as QPSK needs to be used. Because of relatively good environment quality (a relatively high signal-to-noise ratio) of a channel between cell-center UE and a base station, when service data is transmitted to the cell-center UE, a high-order modulation and coding scheme such as 16 QAM or 64QAM may be used to improve a signal transmission bit rate. In the LTE system, when MBMS data is broadcast to all UEs within the cell, to ensure that both the cell-center UE and the cell-edge UE can receive the MBMS data, only the low-order modulation and coding scheme can be selected. In this way, an overall system throughput is reduced, and system spectrum utilization efficiency is relatively low.

SUMMARY

The present invention provides a signal transmission method and apparatus, so as to resolve a problem that system spectrum utilization efficiency and a system throughput are relatively low due to a signal transmission manner in an LTE system.

According to a first aspect, a signal transmission apparatus is provided, including:

a determining module, configured to determine a modulation type of service data that needs to be transmitted, where the modulation type includes hierarchical modulation and non-hierarchical modulation;

a first sending module, configured to modulate, by means of the hierarchical modulation when the determining module determines that the modulation type is the hierarchical modulation, the service data that needs to be transmitted, and send a modulated hierarchical modulation signal to user equipment UE; and a second sending module, configured to send modulation configuration information to the UE, where the modulation configuration information includes information used to indicate the modulation type.

With reference to the first aspect, in a first possible implementation manner, the service data includes base-layer data and additional-layer data, and a priority of the base-layer data is higher than a priority of the additional-layer data; and the hierarchical modulation includes base-layer modulation and additional-layer modulation, where the base-layer modulation is modulation performed on the base-layer data in the service data, and the additional-layer modulation is modulation performed on the additional-layer data in the service data.

With reference to the first possible implementation manner of the first aspect, in a second possible implementation manner, the modulation configuration information further includes a modulation and coding scheme MCS index, different MCS indexes correspond to different MCS configuration information, and the MCS configuration information includes:

either of a total modulation order of the hierarchical modulation and a modulation order of the additional-layer modulation;

either of a total transport block size TBS index value corresponding to the hierarchical modulation and a TBS index value corresponding to the additional-layer modulation; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

With reference to the second possible implementation manner of the first aspect, in a third possible implementation manner, if the modulation configuration information includes either of the total TBS index value corresponding to the hierarchical modulation and the TBS index value corresponding to the additional-layer modulation, a ratio of a modulation order of the base-layer modulation to the modulation order of the additional-layer modulation is equal to a ratio of a TBS index value corresponding to the base-layer modulation to the TBS index value corresponding to the additional-layer modulation; or a product of a ratio of a modulation order of the base-layer modulation to the modulation order of the additional-layer modulation and a ratio of an encoding rate of the base-layer modulation to an encoding rate of the additional-layer modulation is equal to a ratio of a TBS index value corresponding to the base-layer modulation to the TBS index value corresponding to the additional-layer modulation.

With reference to the first possible implementation manner of the first aspect, in a fourth possible implementation manner, the modulation configuration information further includes a modulation and coding scheme MCS index, different MCS indexes correspond to different MCS configuration information, and the MCS configuration information includes:

a modulation order of the modulation at either layer in the hierarchical modulation, and a transport block size TBS index value corresponding to the modulation at either layer; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

With reference to the first possible implementation manner of the first aspect, in a fifth possible implementation manner, the modulation configuration information further includes a modulation and coding scheme MCS index, different MCS indexes correspond to different MCS configuration information, and the MCS configuration information includes:

a modulation order of the base-layer modulation; and a transport block size TBS index value corresponding to the base-layer modulation.

With reference to any one of the second to the fifth possible implementation manners of the first aspect, in a sixth possible implementation manner, the modulation configuration information further includes:

a ratio of a transmit power of a pilot signal to the transmit power of the hierarchical modulation signal; or a ratio of a transmit power of a pilot signal to each of the transmit power of the base-layer modulation signal and the transmit power of the additional-layer modulation signal; or a ratio of a transmit power of a pilot signal to the transmit power of the base-layer modulation signal.

With reference to any one of the first aspect, or the first to the sixth possible implementation manners of the first aspect, in a seventh possible implementation manner, the service data is Multimedia Broadcast Multicast Service MBMS data; and the determining module is specifically configured to determine, when a multicast control channel MCCH and a multicast traffic channel MTCH need to be transmitted on a same subframe, that the modulation type is the hierarchical modulation; and the first sending module is specifically configured to modulate, by using the modulation configuration information used during MCCH modulation, the MBMS data that needs to be transmitted on the MTCH; or the determining module is specifically configured to determine, when a multicast control channel MCCH and a multicast traffic channel MTCH need to be transmitted on a same subframe, that the modulation type is the non-hierarchical modulation; and the first sending module is specifically configured to modulate, by using the modulation configuration information used during MCCH modulation, the MBMS data that needs to be transmitted on the MTCH.

According to a second aspect, a signal transmission apparatus is provided, including:

a first receiving module, configured to receive modulation configuration information sent by a network side device, where the modulation configuration information includes information used to indicate a modulation type of service data, and the modulation type includes hierarchical modulation and non-hierarchical modulation;

a second receiving module, configured to receive a hierarchical modulation signal sent by the network side device, where the hierarchical modulation signal is a signal obtained after the hierarchical modulation is performed on the service data; and a demodulation module, configured to demodulate, according to the modulation configuration information received by the first receiving module, the hierarchical modulation signal received by the second receiving module, so as to obtain the service data.

With reference to the second aspect, in a first possible implementation manner, the service data includes base-layer data and additional-layer data, and a priority of the base-layer data is higher than a priority of the additional-layer data; and the hierarchical modulation includes base-layer modulation and additional-layer modulation, where the base-layer modulation is modulation performed on the base-layer data in the service data, and the additional-layer modulation is modulation performed on the additional-layer data in the service data.

With reference to the first possible implementation manner of the second aspect, in a second possible implementation manner, the modulation configuration information further includes a modulation and coding scheme MCS index, different MCS indexes correspond to different MCS configuration information, and the MCS configuration information includes:

either of a total modulation order of the hierarchical modulation and a modulation order corresponding to the additional-layer modulation;

either of a total transport block size TBS index value corresponding to the hierarchical modulation and a TBS index value corresponding to the additional-layer modulation; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

With reference to the second possible implementation manner of the second aspect, in a third possible implementation manner, if the modulation configuration information includes either of the total TBS index value corresponding to the hierarchical modulation and the TBS index value corresponding to the additional-layer modulation, a ratio of a modulation order of the base-layer modulation to the modulation order of the additional-layer modulation is equal to a ratio of a TBS index value corresponding to the base-layer modulation to the TBS index value corresponding to the additional-layer modulation; or a product of a ratio of a modulation order of the base-layer modulation to the modulation order of the additional-layer modulation and a ratio of an encoding rate of the base-layer modulation to an encoding rate of the additional-layer modulation is equal to a ratio of a TBS index value corresponding to the base-layer modulation to the TBS index value corresponding to the additional-layer modulation.

With reference to the first possible implementation manner of the second aspect, in a fourth possible implementation manner, the modulation configuration information further includes a modulation and coding scheme MCS index, different MCS indexes correspond to different MCS configuration information, and the MCS configuration information includes:

a modulation order of the modulation at either layer in the hierarchical modulation, and a transport block size TBS index value corresponding to the modulation at either layer; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

With reference to the first possible implementation manner of the second aspect, in a fifth possible implementation manner, the modulation configuration information further includes a modulation and coding scheme MCS index, different MCS indexes correspond to different MCS configuration information, and the MCS configuration information includes:

a modulation order of the base-layer modulation; and a transport block size TBS index value corresponding to the base-layer modulation.

With reference to any one of the second to the fifth possible implementation manners of the second aspect, in a sixth possible implementation manner, the modulation configuration information further includes:

a ratio of a transmit power of a pilot signal to the transmit power of the hierarchical modulation signal; or a ratio of a transmit power of a pilot signal to each of the transmit power of the base-layer modulation signal and the transmit power of the additional-layer modulation signal; or a ratio of a transmit power of a pilot signal to the transmit power of the base-layer modulation signal.

According to a third aspect, a signal transmission apparatus is provided, including a processor, a memory, and a bus, where the memory stores an execution instruction; when the apparatus runs, the processor communicates with the memory by using the bus; and the processor executes the execution instruction, so that the apparatus executes the following method:

determining a modulation type of service data that needs to be transmitted, where the modulation type includes hierarchical modulation and non-hierarchical modulation;

modulating, by means of the hierarchical modulation when it is determined that the modulation type is the hierarchical modulation, the service data that needs to be transmitted, and sending a modulated hierarchical modulation signal to user equipment UE; and sending modulation configuration information to the UE, where the modulation configuration information includes information used to indicate the modulation type.

With reference to the third aspect, in a first possible implementation manner, the service data includes base-layer data and additional-layer data, and a priority of the base-layer data is higher than a priority of the additional-layer data; and the hierarchical modulation includes base-layer modulation and additional-layer modulation, where the base-layer modulation is modulation performed on the base-layer data in the service data, and the additional-layer modulation is modulation performed on the additional-layer data in the service data.

With reference to the first possible implementation manner of the third aspect, in a second possible implementation manner, the modulation configuration information further includes a modulation and coding scheme MCS index, different MCS indexes correspond to different MCS configuration information, and the MCS configuration information includes:

either of a total modulation order of the hierarchical modulation and a modulation order of the additional-layer modulation;

either of a total transport block size TBS index value corresponding to the hierarchical modulation and a TBS index value corresponding to the additional-layer modulation; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

With reference to the second possible implementation manner of the third aspect, in a third possible implementation manner, if the modulation configuration information includes either of the total TBS index value corresponding to the hierarchical modulation and the TBS index value corresponding to the additional-layer modulation, a ratio of a modulation order of the base-layer modulation to the modulation order of the additional-layer modulation is equal to a ratio of a TBS index value corresponding to the base-layer modulation to the TBS index value corresponding to the additional-layer modulation; or a product of a ratio of a modulation order of the base-layer modulation to the modulation order of the additional-layer modulation and a ratio of an encoding rate of the base-layer modulation to an encoding rate of the additional-layer modulation is equal to a ratio of a TBS index value corresponding to the base-layer modulation to the TBS index value corresponding to the additional-layer modulation.

With reference to the first possible implementation manner of the third aspect, in a fourth possible implementation manner, the modulation configuration information further includes a modulation and coding scheme MCS index, different MCS indexes correspond to different MCS configuration information, and the MCS configuration information includes:

a modulation order of the modulation at either layer in the hierarchical modulation, and a transport block size TBS index value corresponding to the modulation at either layer; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

With reference to the first possible implementation manner of the third aspect, in a fifth possible implementation manner, the modulation configuration information further includes a modulation and coding scheme MCS index, different MCS indexes correspond to different MCS configuration information, and the MCS configuration information includes:

a modulation order of the base-layer modulation; and a transport block size TBS index value corresponding to the base-layer modulation.

With reference to any one of the second to the fifth possible implementation manners of the third aspect, in a sixth possible implementation manner, the modulation configuration information further includes:

a ratio of a transmit power of a pilot signal to the transmit power of the hierarchical modulation signal; or a ratio of a transmit power of a pilot signal to each of the transmit power of the base-layer modulation signal and the transmit power of the additional-layer modulation signal; or a ratio of a transmit power of a pilot signal to the transmit power of the base-layer modulation signal.

With reference to any one of the third aspect, or the first to the sixth possible implementation manners of the third aspect, in a seventh possible implementation manner, the service data is Multimedia Broadcast Multicast Service MBMS data; and in the method executed by the processor, the determining a modulation type of service data that needs to be transmitted includes determining, when a multicast control channel MCCH and a multicast traffic channel MTCH need to be transmitted on a same subframe, that the modulation type is the hierarchical modulation; and the modulating, by means of the hierarchical modulation when it is determined that the modulation type is the hierarchical modulation, the service data that needs to be transmitted includes: modulating, by using the modulation configuration information used during MCCH modulation, the MBMS data that needs to be transmitted on the MTCH; or in the method executed by the processor, the determining a modulation type of service data that needs to be transmitted includes determining, when a multicast control channel MCCH and a multicast traffic channel MTCH need to be transmitted on a same subframe, that the modulation type is the non-hierarchical modulation; and after it is determined that the modulation type is the non-hierarchical modulation, the determining a modulation type of service data that needs to be transmitted further includes modulating, by using the modulation configuration information used during MCCH modulation, the MBMS data that needs to be transmitted on the MTCH.

According to a fourth aspect, a signal transmission apparatus is provided, including a processor, a memory, and a bus, where the memory stores an execution instruction; when the apparatus runs, the processor communicates with the memory by using the bus; and the processor executes the execution instruction, so that the apparatus executes the following method:

receiving modulation configuration information sent by a network side device, where the modulation configuration information includes information used to indicate a modulation type of service data, and the modulation type includes hierarchical modulation and non-hierarchical modulation;

receiving a hierarchical modulation signal sent by the network side device, where the hierarchical modulation signal is a signal obtained after the hierarchical modulation is performed on the service data; and demodulating, according to the received modulation configuration information, the received hierarchical modulation signal, so as to obtain the service data.

With reference to the fourth aspect, in a first possible implementation manner, the service data includes base-layer data and additional-layer data, and a priority of the base-layer data is higher than a priority of the additional-layer data; and the hierarchical modulation includes base-layer modulation and additional-layer modulation, where the base-layer modulation is modulation performed on the base-layer data in the service data, and the additional-layer modulation is modulation performed on the additional-layer data in the service data.

With reference to the first possible implementation manner of the fourth aspect, in a second possible implementation manner, the modulation configuration information further includes a modulation and coding scheme MCS index, different MCS indexes correspond to different MCS configuration information, and the MCS configuration information includes:

either of a total modulation order of the hierarchical modulation and a modulation order corresponding to the additional-layer modulation;

either of a total transport block size TBS index value corresponding to the hierarchical modulation and a TBS index value corresponding to the additional-layer modulation; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

With reference to the second possible implementation manner of the fourth aspect, in a third possible implementation manner, if the modulation configuration information includes either of the total TBS index value corresponding to the hierarchical modulation and the TBS index value corresponding to the additional-layer modulation, a ratio of a modulation order of the base-layer modulation to the modulation order of the additional-layer modulation is equal to a ratio of a TBS index value corresponding to the base-layer modulation to the TBS index value corresponding to the additional-layer modulation; or a product of a ratio of a modulation order of the base-layer modulation to the modulation order of the additional-layer modulation and a ratio of an encoding rate of the base-layer modulation to an encoding rate of the additional-layer modulation is equal to a ratio of a TBS index value corresponding to the base-layer modulation to the TBS index value corresponding to the additional-layer modulation.

With reference to the first possible implementation manner of the fourth aspect, in a fourth possible implementation manner, the modulation configuration information further includes a modulation and coding scheme MCS index, different MCS indexes correspond to different MCS configuration information, and the MCS configuration information includes:

a modulation order of the modulation at either layer in the hierarchical modulation, and a transport block size TBS index value corresponding to the modulation at either layer; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

With reference to the first possible implementation manner of the fourth aspect, in a fifth possible implementation manner, the modulation configuration information further includes a modulation and coding scheme MCS index, different MCS indexes correspond to different MCS configuration information, and the MCS configuration information includes:

a modulation order of the base-layer modulation; and a transport block size TBS index value corresponding to the base-layer modulation.

With reference to any one of the second to the fifth possible implementation manners of the fourth aspect, in a sixth possible implementation manner, the modulation configuration information further includes:

a ratio of a transmit power of a pilot signal to the transmit power of the hierarchical modulation signal; or a ratio of a transmit power of a pilot signal to each of the transmit power of the base-layer modulation signal and the transmit power of the additional-layer modulation signal; or a ratio of a transmit power of a pilot signal to the transmit power of the base-layer modulation signal.

According to a fifth aspect, a signal transmission method is provided, including: determining a modulation type of service data that needs to be transmitted, where the modulation type includes hierarchical modulation and non-hierarchical modulation;

modulating, by means of the hierarchical modulation when it is determined that the modulation type is the hierarchical modulation, the service data that needs to be transmitted, and sending a modulated hierarchical modulation signal to user equipment UE; and sending modulation configuration information to the UE, where the modulation configuration information includes information used to indicate the modulation type.

With reference to the fifth aspect, in a first possible implementation manner, the service data includes base-layer data and additional-layer data, and a priority of the base-layer data is higher than a priority of the additional-layer data; and the hierarchical modulation includes base-layer modulation and additional-layer modulation, where the base-layer modulation is modulation performed on the base-layer data in the service data, and the additional-layer modulation is modulation performed on the additional-layer data in the service data.

With reference to the first possible implementation manner of the fifth aspect, in a second possible implementation manner, the modulation configuration information further includes a modulation and coding scheme MCS index, different MCS indexes correspond to different MCS configuration information, and the MCS configuration information includes:

either of a total modulation order of the hierarchical modulation and a modulation order of the additional-layer modulation;

either of a total transport block size TBS index value corresponding to the hierarchical modulation and a TBS index value corresponding to the additional-layer modulation; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

With reference to the second possible implementation manner of the fifth aspect, in a third possible implementation manner, if the modulation configuration information includes either of the total TBS index value corresponding to the hierarchical modulation and the TBS index value corresponding to the additional-layer modulation, a ratio of a modulation order of the base-layer modulation to the modulation order of the additional-layer modulation is equal to a ratio of a TBS index value corresponding to the base-layer modulation to the TBS index value corresponding to the additional-layer modulation; or a product of a ratio of a modulation order of the base-layer modulation to the modulation order of the additional-layer modulation and a ratio of an encoding rate of the base-layer modulation to an encoding rate of the additional-layer modulation is equal to a ratio of a TBS index value corresponding to the base-layer modulation to the TBS index value corresponding to the additional-layer modulation.

With reference to the first possible implementation manner of the fifth aspect, in a fourth possible implementation manner, the modulation configuration information further includes a modulation and coding scheme MCS index, different MCS indexes correspond to different MCS configuration information, and the MCS configuration information includes:

a modulation order of the modulation at either layer in the hierarchical modulation, and a transport block size TBS index value corresponding to the modulation at either layer; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

With reference to the first possible implementation manner of the fifth aspect, in a fifth possible implementation manner, the modulation configuration information further includes a modulation and coding scheme MCS index, different MCS indexes correspond to different MCS configuration information, and the MCS configuration information includes:

a modulation order of the base-layer modulation; and a transport block size TBS index value corresponding to the base-layer modulation.

With reference to any one of the second to the fifth possible implementation manners of the fifth aspect, in a sixth possible implementation manner, the modulation configuration information further includes:

a ratio of a transmit power of a pilot signal to the transmit power of the hierarchical modulation signal; or a ratio of a transmit power of a pilot signal to each of the transmit power of the base-layer modulation signal and the transmit power of the additional-layer modulation signal; or a ratio of a transmit power of a pilot signal to the transmit power of the base-layer modulation signal.

With reference to any one of the fifth aspect, or the first to the sixth possible implementation manners of the fifth aspect, in a seventh possible implementation manner, the service data is Multimedia Broadcast Multicast Service MBMS data; and the determining a modulation type of service data that needs to be transmitted includes determining, when a multicast control channel MCCH and a multicast traffic channel MTCH need to be transmitted on a same subframe, that the modulation type is the hierarchical modulation; and the modulating, by means of the hierarchical modulation when it is determined that the modulation type is the hierarchical modulation, the service data that needs to be transmitted includes: modulating, by using the modulation configuration information used during MCCH modulation, the MBMS data that needs to be transmitted on the MTCH; or the determining a modulation type of service data that needs to be transmitted includes determining, when a multicast control channel MCCH and a multicast traffic channel MTCH need to be transmitted on a same subframe, that the modulation type is the non-hierarchical modulation; and after it is determined that the modulation type is the non-hierarchical modulation, the determining a modulation type of service data that needs to be transmitted further includes modulating, by using the modulation configuration information used during MCCH modulation, the MBMS data that needs to be transmitted on the MTCH.

According to a sixth aspect, a signal transmission method is provided, including:

receiving modulation configuration information sent by a network side device, where the modulation configuration information includes information used to indicate a modulation type of service data, and the modulation type includes hierarchical modulation and non-hierarchical modulation;

receiving a hierarchical modulation signal sent by the network side device, where the hierarchical modulation signal is a signal obtained after the hierarchical modulation is performed on the service data; and demodulating, according to the modulation configuration information, the received hierarchical modulation signal, so as to obtain the service data.

With reference to the sixth aspect, in a first possible implementation manner, the service data includes base-layer data and additional-layer data, and a priority of the base-layer data is higher than a priority of the additional-layer data; and the hierarchical modulation includes base-layer modulation and additional-layer modulation, where the base-layer modulation is modulation performed on the base-layer data in the service data, and the additional-layer modulation is modulation performed on the additional-layer data in the service data.

With reference to the first possible implementation manner of the sixth aspect, in a second possible implementation manner, the modulation configuration information further includes a modulation and coding scheme MCS index, different MCS indexes correspond to different MCS configuration information, and the MCS configuration information includes:

either of a total modulation order of the hierarchical modulation and a modulation order corresponding to the additional-layer modulation;

either of a total transport block size TBS index value corresponding to the hierarchical modulation and a TBS index value corresponding to the additional-layer modulation; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

With reference to the second possible implementation manner of the sixth aspect, in a third possible implementation manner, if the modulation configuration information includes either of the total TBS index value corresponding to the hierarchical modulation and the TBS index value corresponding to the additional-layer modulation, a ratio of a modulation order of the base-layer modulation to the modulation order of the additional-layer modulation is equal to a ratio of a TBS index value corresponding to the base-layer modulation to the TBS index value corresponding to the additional-layer modulation; or a product of a ratio of a modulation order of the base-layer modulation to the modulation order of the additional-layer modulation and a ratio of an encoding rate of the base-layer modulation to an encoding rate of the additional-layer modulation is equal to a ratio of a TBS index value corresponding to the base-layer modulation to the TBS index value corresponding to the additional-layer modulation.

With reference to the first possible implementation manner of the sixth aspect, in a fourth possible implementation manner, the modulation configuration information further includes a modulation and coding scheme MCS index, different MCS indexes correspond to different MCS configuration information, and the MCS configuration information includes:

a modulation order of the modulation at either layer in the hierarchical modulation, and a transport block size TBS index value corresponding to the modulation at either layer; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

With reference to the first possible implementation manner of the sixth aspect, in a fifth possible implementation manner, the modulation configuration information further includes a modulation and coding scheme MCS index, different MCS indexes correspond to different MCS configuration information, and the MCS configuration information includes:

a modulation order of the base-layer modulation; and a transport block size TBS index value corresponding to the base-layer modulation.

With reference to any one of the second to the fifth possible implementation manners of the sixth aspect, in a sixth possible implementation manner, the modulation configuration information further includes:

a ratio of a transmit power of a pilot signal to the transmit power of the hierarchical modulation signal; or a ratio of a transmit power of a pilot signal to each of the transmit power of the base-layer modulation signal and the transmit power of the additional-layer modulation signal; or a ratio of a transmit power of a pilot signal to the transmit power of the base-layer modulation signal.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
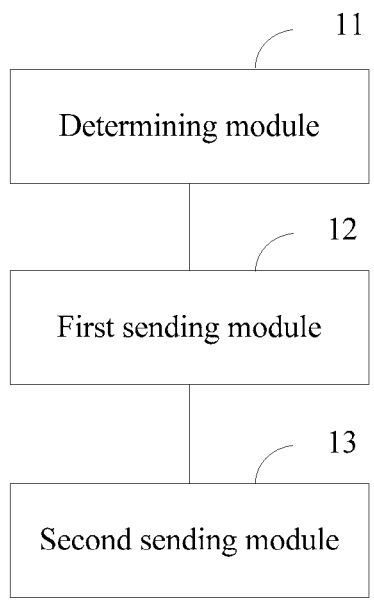
FIG. 1 is a schematic structural diagram of a signal transmission apparatus according to Embodiment 1 of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

In the embodiments of the present invention, a network side device may select hierarchical modulation as a modulation type of to-be-transmitted data, and send modulation configuration information of the hierarchical modulation to UE. In this way, the UE may use the modulation configuration information to demodulate a received hierarchical modulation signal that is from the network side device. The hierarchical modulation may also be referred to as embedded modulation, multi-resolution modulation, asymmetrical modulation, or non-uniform modulation. A basic idea of the hierarchical modulation is mapping data with different quality of service (QoS) to different layers.

By using this hierarchical modulation scheme, different MBMS data may be provided for different UEs. For example, when the MBMS data is sent to cell-center UE and cell-edge UE, high-priority data may be modulated by means of base-layer modulation (such as QPSK) in the hierarchical modulation, and low-priority data may be modulated by means of additional-layer modulation (such as 16QAM) in the hierarchical modulation. In this way, not only both cell-center UE with a relatively good channel condition and cell-edge UE with a relatively poor channel condition can obtain the high-priority data from the hierarchical modulation signal by means of correct demodulation, but also the cell-center UE with the relatively good channel condition can further obtain the low-priority data from the hierarchical modulation signal by means of correct demodulation. Herein, data with different priorities needs different operating points to reach a same block error ratio (BLER). The high-priority data needs strict protection. Specifically, a required target BLER (such as a BLER at 1%) needs to be reached in a case of a relatively low signal to interference plus noise ratio (SINR). The low-priority data needs protection with a relatively low degree. Specifically, the required target BLER (such as a BLER at 1%) needs to be reached in a case of a relatively high SINR. Alternatively, a data service supported by the high-priority data needs a relatively large coverage area, for example, a national broadcast service of China Central Television. A data service supported by the low-priority data needs a relatively small coverage area, for example, a service of a local radio station. By using this scheme, system spectrum utilization efficiency and a system throughput can be greatly improved.

The embodiments of the present invention not only can be applied to transmission of the foregoing MBMS service, but also can be applied to transmission of a unicast service. When the unicast service is transmitted, modulation at different layers may be used to modulate different unicast service data respectively. The different unicast service data includes high-priority data and low-priority data. The high-priority data needs to be allocated to UE with a relatively poor channel condition (such as cell-edge UE), and the low-priority unicast service data needs to be allocated to UE with a relatively good channel condition (such as cell-center UE). After a modulated hierarchical modulation signal is transmitted to UEs with different channel conditions, each UE may obtain unicast service data of the UE from the hierarchical modulation signal by means of demodulation.

The following further describes the embodiments of the present invention in detail with reference to accompanying drawings in this specification.

The following embodiments of the present invention first describe implementation of a signal transmission apparatus. The implementation of the signal transmission apparatus in the present invention is similar to that of a signal transmission method in the present invention. For specific implementation, reference may be made to implementation of the signal transmission method described in subsequent embodiments, and no repeated description is provided.

As shown in FIG. 1, FIG. 1 is a schematic structural diagram of a signal transmission apparatus according to Embodiment 1 of the present invention, and the signal transmission apparatus includes a determining module 11, a first sending module 12, and a second sending module 13.

The determining module 11 is configured to determine a modulation type of service data that needs to be transmitted, where the modulation type includes hierarchical modulation and non-hierarchical modulation.

Herein, the foregoing execution instruction of the determining module 11 may be specifically executed by a processor in a network side device.

The first sending module 12 is configured to modulate, by means of the hierarchical modulation when the determining module 11 determines that the modulation type is the hierarchical modulation, the service data that needs to be transmitted, and send a modulated hierarchical modulation signal to user equipment UE.

The second sending module 13 is configured to send modulation configuration information to the UE, where the modulation configuration information includes information used to indicate the modulation type.

Herein, the foregoing execution instructions of the first sending module 12 and the second sending module 13 may be specifically executed by a transmitter in the network side device.

It should be noted that the first sending module 12 may send the hierarchical modulation signal while the second sending module 13 sends the modulation configuration information, or may send the hierarchical modulation signal after the second sending module 13 sends the modulation configuration information. An execution sequence of the two is not limited in this embodiment of the present invention.

In this embodiment of the present invention, for the service data that needs to be transmitted, the determining module 11 determines the modulation type that needs to be used. The modulation type may be the non-hierarchical modulation (that is, a single modulation scheme) or the hierarchical modulation. Optionally, for the modulation type of hierarchical modulation, the service data includes base-layer data and additional-layer data, and a priority of the base-layer data is higher than a priority of the additional-layer data (that is, a protection degree required by the base-layer data is greater than a protection degree required by the additional-layer data). The hierarchical modulation includes base-layer modulation and additional-layer modulation, where the base-layer modulation is modulation performed on the base-layer data in the service data, and the additional-layer modulation is modulation performed on the additional-layer data in the service data, that is, a priority of a base-layer modulation signal is greater than a priority of an additional-layer modulation signal.

In addition to the modulation type, to correctly demodulate the received hierarchical modulation signal, the UE needs to determine various modulation parameter values corresponding to the hierarchical modulation signal, such as a modulation order of the modulation at either layer (different modulation orders correspond to different modulation schemes), a transport block size (TBS) index value, a power of a modulation signal at either layer, and an encoding rate.

In this embodiment of the present invention, the foregoing other modulation parameter values except the modulation type may be predefined on a UE side, or the other modulation parameter values may be notified to the UE by using any one of the following three configuration manners. The three configuration manners provided in the following embodiment of the present invention respectively include: notifying the UE of a modulation parameter value corresponding to the hierarchical modulation or corresponding to the additional-layer modulation; notifying the UE of a modulation parameter value corresponding to the modulation at either layer; and notifying the UE of a modulation parameter value corresponding to the base-layer modulation. The following describes the three configuration manners one by one.

In the first manner, the UE is notified of the modulation parameter value corresponding to the hierarchical modulation or corresponding to the additional-layer modulation.

In this configuration manner, the network side device does not need to notify the UE of parameter values such as a modulation order and a TBS index value of the base-layer modulation, which may save signaling overheads.

Specifically, the modulation configuration information further includes a modulation and coding scheme MCS index, different MCS indexes correspond to different MCS configuration information, and the MCS configuration information includes:

either of a total modulation order of the hierarchical modulation and a modulation order of the additional-layer modulation;

either of a total transport block size TBS index value corresponding to the hierarchical modulation and a TBS index value corresponding to the additional-layer modulation; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

Optionally, if the modulation configuration information includes either of the total TBS index value corresponding to the hierarchical modulation and the TBS index value corresponding to the additional-layer modulation, a ratio of the modulation order of the base-layer modulation to the modulation order of the additional-layer modulation is equal to a ratio of the TBS index value corresponding to the base-layer modulation to the TBS index value corresponding to the additional-layer modulation; or a product of a ratio of the modulation order of the base-layer modulation to the modulation order of the additional-layer modulation and a ratio of an encoding rate of the base-layer modulation to an encoding rate of the additional-layer modulation is equal to a ratio of the TBS index value corresponding to the base-layer modulation to the TBS index value corresponding to the additional-layer modulation.

Optionally, in a case of this kind of modulation configuration information, the modulation configuration information further includes:

a ratio of a transmit power of a pilot signal to the transmit power of the hierarchical modulation signal; or a ratio of a transmit power of a pilot signal to each of the transmit power of the base-layer modulation signal and the transmit power of the additional-layer modulation signal; or a ratio of a transmit power of a pilot signal to the transmit power of the base-layer modulation signal.

In the second manner, the UE is notified of the modulation parameter value corresponding to the modulation at either layer.

In this configuration manner, a modulation order and a TBS index value that correspond to the modulation at either layer may be notified to the UE together. In this separate configuration manner, parameter configuration becomes more flexible, and data processing on the UE side becomes less complex.

Specifically, the modulation configuration information further includes a modulation and coding scheme MCS index, different MCS indexes correspond to different MCS configuration information, and the MCS configuration information includes:

the modulation order of the modulation at either layer in the hierarchical modulation, and the transport block size TBS index value corresponding to the modulation at either layer; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

Optionally, in a case of this kind of modulation configuration information, the modulation configuration information further includes:

a ratio of a transmit power of a pilot signal to the transmit power of the hierarchical modulation signal; or a ratio of a transmit power of a pilot signal to each of the transmit power of the base-layer modulation signal and the transmit power of the additional-layer modulation signal; or a ratio of a transmit power of a pilot signal to the transmit power of the base-layer modulation signal.

In the third manner, the UE is notified of the modulation parameter value corresponding to the base-layer modulation.

In this configuration manner, for all UEs within a cell, only a modulation order and a TBS index value that are of the base-layer modulation may be notified, which reduces data processing complexity for UE that does not support the hierarchical modulation.

Specifically, the modulation configuration information further includes a modulation and coding scheme MCS index, different MCS indexes correspond to different MCS configuration information, and the MCS configuration information includes:

the modulation order of the base-layer modulation; and the transport block size TBS index value corresponding to the base-layer modulation.

Optionally, in a case of this kind of modulation configuration information, the modulation configuration information further includes:

a ratio of a transmit power of a pilot signal to the transmit power of the base-layer modulation signal.

Optionally, the service data is Multimedia Broadcast Multicast Service MBMS data.

The determining module 11 is specifically configured to determine, when a multicast control channel MCCH and a multicast traffic channel MTCH need to be transmitted on a same subframe, that the modulation type is the hierarchical modulation; and the first sending module 12 is specifically configured to modulate, by using the modulation configuration information used during MCCH modulation, the MBMS data that needs to be transmitted on the MTCH; or the determining module 11 is specifically configured to determine, when a multicast control channel MCCH and a multicast traffic channel MTCH need to be transmitted on a same subframe, that the modulation type is the non-hierarchical modulation; and the first sending module 12 is specifically configured to modulate, by using the modulation configuration information used during MCCH modulation, the MBMS data that needs to be transmitted on the MTCH.

Figure 2:
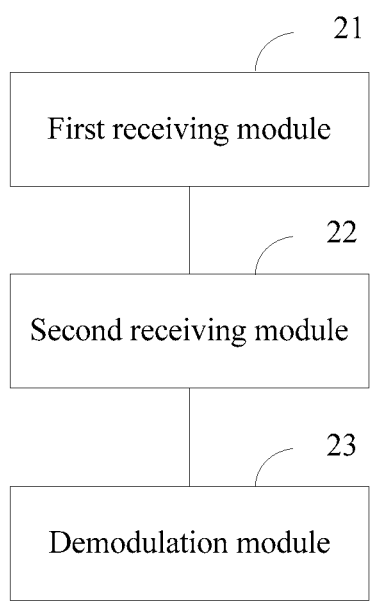
FIG. 2 is a schematic structural diagram of a signal transmission apparatus according to Embodiment 2 of the present invention.

As shown in FIG. 2, FIG. 2 is a schematic structural diagram of a signal transmission apparatus according to Embodiment 2 of the present invention, and the signal transmission apparatus includes: a first receiving module 21, a second receiving module 22, and a demodulation module 23.

The first receiving module 21 is configured to receive modulation configuration information sent by a network side device, where the modulation configuration information includes information used to indicate a modulation type of service data, and the modulation type includes hierarchical modulation and non-hierarchical modulation.

The second receiving module 22 is configured to receive a hierarchical modulation signal sent by the network side device, where the hierarchical modulation signal is a signal obtained after the hierarchical modulation is performed on the service data.

Herein, the foregoing execution instructions of the first receiving module 21 and the second receiving module 22 may be specifically executed by a receiver in user equipment UE.

The demodulation module 23 is configured to demodulate, according to the modulation configuration information received by the first receiving module 21, the hierarchical modulation signal received by the second receiving module 22, so as to obtain the service data.

Herein, the foregoing execution instruction of the demodulation module 23 may be specifically executed by a processor in the user equipment UE.

Optionally, the service data includes base-layer data and additional-layer data, and a priority of the base-layer data is higher than a priority of the additional-layer data.

The hierarchical modulation includes base-layer modulation and additional-layer modulation, where the base-layer modulation is modulation performed on the base-layer data in the service data, and the additional-layer modulation is modulation performed on the additional-layer data in the service data.

In addition to the modulation type, the foregoing modulation configuration information may further include any one of the following three kinds.

In a first kind, the modulation configuration information further includes a modulation and coding scheme MCS index, different MCS indexes correspond to different MCS configuration information, and the MCS configuration information includes:

either of a total modulation order of the hierarchical modulation and a modulation order of the additional-layer modulation;

either of a total transport block size TBS index value corresponding to the hierarchical modulation and a TBS index value corresponding to the additional-layer modulation; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

Optionally, if the modulation configuration information includes either of the total TBS index value corresponding to the hierarchical modulation and the TBS index value corresponding to the additional-layer modulation, a ratio of a modulation order of the base-layer modulation to the modulation order of the additional-layer modulation is equal to a ratio of a TBS index value corresponding to the base-layer modulation to the TBS index value corresponding to the additional-layer modulation; or a product of a ratio of a modulation order of the base-layer modulation to the modulation order of the additional-layer modulation and a ratio of an encoding rate of the base-layer modulation to an encoding rate of the additional-layer modulation is equal to a ratio of a TBS index value corresponding to the base-layer modulation to the TBS index value corresponding to the additional-layer modulation.

Optionally, in a case of this kind of modulation configuration information, the modulation configuration information further includes:

a ratio of a transmit power of a pilot signal to the transmit power of the hierarchical modulation signal; or a ratio of a transmit power of a pilot signal to each of the transmit power of the base-layer modulation signal and the transmit power of the additional-layer modulation signal; or a ratio of a transmit power of a pilot signal to the transmit power of the base-layer modulation signal.

In a second kind, the modulation configuration information further includes a modulation and coding scheme MCS index, different MCS indexes correspond to different MCS configuration information, and the MCS configuration information includes:

a modulation order of the modulation at either layer in the hierarchical modulation, and a transport block size TBS index value corresponding to the modulation at either layer; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

Optionally, in a case of this kind of modulation configuration information, the modulation configuration information further includes:

a ratio of a transmit power of a pilot signal to the transmit power of the hierarchical modulation signal; or a ratio of a transmit power of a pilot signal to each of the transmit power of the base-layer modulation signal and the transmit power of the additional-layer modulation signal; or a ratio of a transmit power of a pilot signal to the transmit power of the base-layer modulation signal.

In a third kind, the modulation configuration information further includes a modulation and coding scheme MCS index, different MCS indexes correspond to different MCS configuration information, and the MCS configuration information includes:

a modulation order of the base-layer modulation; and a transport block size TBS index value corresponding to the base-layer modulation.

Optionally, in a case of this kind of modulation configuration information, the modulation configuration information further includes:

a ratio of a transmit power of a pilot signal to the transmit power of the base-layer modulation signal.

Figure 3:
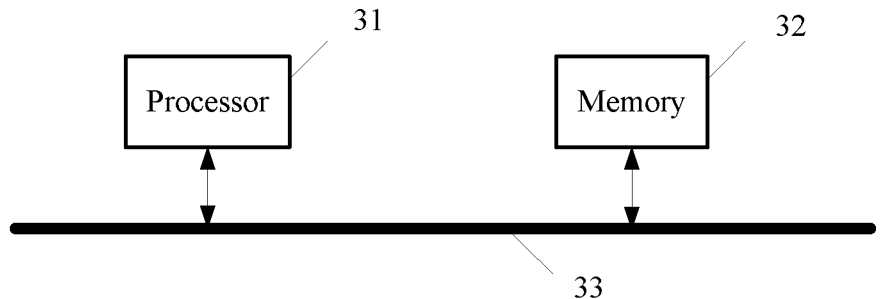
FIG. 3 is a schematic structural diagram of a signal transmission apparatus according to Embodiment 3 of the present invention.

As shown in FIG. 3, FIG. 3 is a schematic structural diagram of a signal transmission apparatus according to Embodiment 3 of the present invention, and the signal transmission apparatus includes a processor 31, a memory 32, and a bus 33. The memory 32 stores an execution instruction. When the apparatus runs, the processor 31 communicates with the memory 32 by using the bus. The processor 31 executes the execution instruction, so that the apparatus executes the following method:

determining a modulation type of service data that needs to be transmitted, where the modulation type includes hierarchical modulation and non-hierarchical modulation;

modulating, by means of the hierarchical modulation when it is determined that the modulation type is the hierarchical modulation, the service data that needs to be transmitted, and sending a modulated hierarchical modulation signal to user equipment UE; and sending modulation configuration information to the UE, where the modulation configuration information includes information used to indicate the modulation type.

It should be noted that when executing the foregoing method, the processor 31 may send the hierarchical modulation signal and the modulation configuration information at the same time, or may send the hierarchical modulation signal after sending the modulation configuration information. An execution sequence of the two is not limited in this embodiment of the present invention.

In this embodiment of the present invention, for the service data that needs to be transmitted, the processor 31 determines the modulation type that needs to be used. The modulation type may be the non-hierarchical modulation (that is, a single modulation scheme) or the hierarchical modulation. Optionally, for the modulation type of hierarchical modulation, the service data includes base-layer data and additional-layer data, and a priority of the base-layer data is higher than a priority of the additional-layer data (that is, a protection degree required by the base-layer data is greater than a protection degree required by the additional-layer data). The hierarchical modulation includes base-layer modulation and additional-layer modulation, where the base-layer modulation is modulation performed on the base-layer data in the service data, and the additional-layer modulation is modulation performed on the additional-layer data in the service data, that is, a priority of a base-layer modulation signal is greater than a priority of an additional-layer modulation signal.

In addition to the modulation type, to correctly demodulate the received hierarchical modulation signal, the UE needs to determine various modulation parameter values corresponding to the hierarchical modulation signal, such as a modulation order of the modulation at either layer (different modulation orders correspond to different modulation schemes), a transport block size (Transport Block Size, TBS) index value, a power of a modulation signal at either layer, and an encoding rate.

In this embodiment of the present invention, the foregoing other modulation parameter values except the modulation type may be predefined on a UE side, or the other modulation parameter values may be notified to the UE by using any one of the following three configuration manners. The three configuration manners provided in the following embodiment of the present invention respectively include: notifying the UE of a modulation parameter value corresponding to the hierarchical modulation or corresponding to the additional-layer modulation; notifying the UE of a modulation parameter value corresponding to the modulation at either layer; and notifying the UE of a modulation parameter value corresponding to the base-layer modulation. The following describes the three configuration manners one by one.

In the first manner, the UE is notified of the modulation parameter value corresponding to the hierarchical modulation or corresponding to the additional-layer modulation.

In this configuration manner, the processor 31 does not need to notify the UE of parameter values such as a modulation order and a TBS index value of the base-layer modulation, which may save signaling overheads.

Specifically, the modulation configuration information further includes a modulation and coding scheme MCS index, different MCS indexes correspond to different MCS configuration information, and the MCS configuration information includes:

either of a total modulation order of the hierarchical modulation and a modulation order of the additional-layer modulation;

either of a total transport block size TBS index value corresponding to the hierarchical modulation and a TBS index value corresponding to the additional-layer modulation; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of the transmit power of a base-layer modulation signal to a transmit power of an additional-layer modulation signal.

Optionally, if the modulation configuration information includes either of the total TBS index value corresponding to the hierarchical modulation and the TBS index value corresponding to the additional-layer modulation, a ratio of the modulation order of the base-layer modulation to the modulation order of the additional-layer modulation is equal to a ratio of the TBS index value corresponding to the base-layer modulation to the TBS index value corresponding to the additional-layer modulation; or a product of a ratio of the modulation order of the base-layer modulation to the modulation order of the additional-layer modulation and a ratio of an encoding rate of the base-layer modulation to an encoding rate of the additional-layer modulation is equal to a ratio of the TBS index value corresponding to the base-layer modulation to the TBS index value corresponding to the additional-layer modulation.

Optionally, in a case of this kind of modulation configuration information, the modulation configuration information further includes:

a ratio of a transmit power of a pilot signal to the transmit power of the hierarchical modulation signal; or a ratio of a transmit power of a pilot signal to each of the transmit power of the base-layer modulation signal and the transmit power of the additional-layer modulation signal; or a ratio of a transmit power of a pilot signal to the transmit power of the base-layer modulation signal.

In the second manner, the UE is notified of the modulation parameter value corresponding to the modulation at either layer.

In this configuration manner, a modulation order and a TBS index value that correspond to the modulation at either layer may be notified to the UE together. In this separate configuration manner, parameter configuration becomes more flexible, and data processing on the UE side becomes less complex.

Specifically, the modulation configuration information further includes a modulation and coding scheme MCS index, different MCS indexes correspond to different MCS configuration information, and the MCS configuration information includes:

the modulation order of the modulation at either layer in the hierarchical modulation, and the transport block size TBS index value corresponding to the modulation at either layer; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

Optionally, in a case of this kind of modulation configuration information, the modulation configuration information further includes:

a ratio of a transmit power of a pilot signal to the transmit power of the hierarchical modulation signal; or a ratio of a transmit power of a pilot signal to each of the transmit power of the base-layer modulation signal and the transmit power of the additional-layer modulation signal; or a ratio of a transmit power of a pilot signal to the transmit power of the base-layer modulation signal.

In the third manner, the UE is notified of the modulation parameter value corresponding to the base-layer modulation.

In this configuration manner, for all UEs within a cell, only a modulation order and a TBS index value that are of the base-layer modulation may be notified, which reduces data processing complexity for UE that does not support the hierarchical modulation.

Specifically, the modulation configuration information further includes a modulation and coding scheme MCS index, different MCS indexes correspond to different MCS configuration information, and the MCS configuration information includes:

the modulation order of the base-layer modulation; and the transport block size TBS index value corresponding to the base-layer modulation.

Optionally, in a case of this kind of modulation configuration information, the modulation configuration information further includes:

a ratio of a transmit power of a pilot signal to the transmit power of the base-layer modulation signal.

Optionally, the service data is Multimedia Broadcast Multicast Service MBMS data.

In the method executed by the processor, the determining a modulation type of service data that needs to be transmitted includes determining, when a multicast control channel MCCH and a multicast traffic channel MTCH need to be transmitted on a same subframe, that the modulation type is the hierarchical modulation; and in the method executed by the processor, the modulating, by means of the hierarchical modulation, the service data that needs to be transmitted includes modulating, by using the modulation configuration information used during MCCH modulation, the MBMS data that needs to be transmitted on the MTCH; or in the method executed by the processor, the determining a modulation type of service data that needs to be transmitted includes determining, when a multicast control channel MCCH and a multicast traffic channel MTCH need to be transmitted on a same subframe, that the modulation type is the non-hierarchical modulation; and after it is determined that the modulation type is the non-hierarchical modulation, the determining a modulation type of service data that needs to be transmitted further includes modulating, by using the modulation configuration information used during MCCH modulation, the MBMS data that needs to be transmitted on the MTCH.

Figure 4:
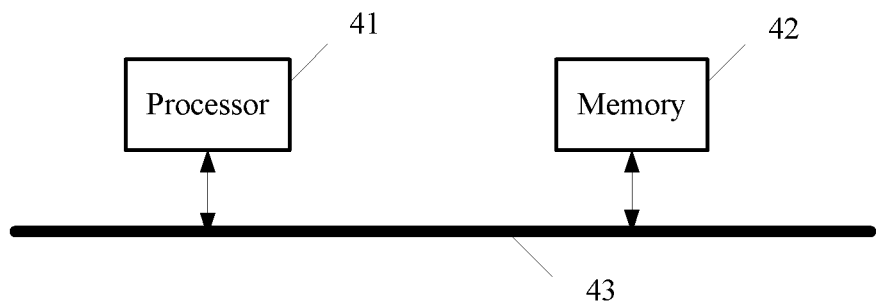
FIG. 4 is a schematic structural diagram of a signal transmission apparatus according to Embodiment 4 of the present invention.

As shown in FIG. 4, FIG. 4 is a schematic structural diagram of a signal transmission apparatus according to Embodiment 4 of the present invention, and the signal transmission apparatus includes a processor 41, a memory 42, and a bus 43. The memory 42 stores an execution instruction. When the apparatus runs, the processor 41 communicates with the memory 42 by using the bus. The processor 41 executes the execution instruction, so that the apparatus executes the following method:

receiving modulation configuration information sent by a network side device, where the modulation configuration information includes information used to indicate a modulation type of service data, and the modulation type includes hierarchical modulation and non-hierarchical modulation;

receiving a hierarchical modulation signal sent by the network side device, where the hierarchical modulation signal is a signal obtained after the hierarchical modulation is performed on the service data; and demodulating, according to the received modulation configuration information, the received hierarchical modulation signal, so as to obtain the service data.

Optionally, the service data includes base-layer data and additional-layer data, and a priority of the base-layer data is higher than a priority of the additional-layer data.

The hierarchical modulation includes base-layer modulation and additional-layer modulation, where the base-layer modulation is modulation performed on the base-layer data in the service data, and the additional-layer modulation is modulation performed on the additional-layer data in the service data.

In addition to the modulation type, the foregoing modulation configuration information may further include any one of the following three kinds.

In a first kind, the modulation configuration information further includes a modulation and coding scheme MCS index, different MCS indexes correspond to different MCS configuration information, and the MCS configuration information includes:

either of a total modulation order of the hierarchical modulation and a modulation order of the additional-layer modulation;

either of a total transport block size TBS index value corresponding to the hierarchical modulation and a TBS index value corresponding to the additional-layer modulation; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

Optionally, if the modulation configuration information includes either of the total TBS index value corresponding to the hierarchical modulation and the TBS index value corresponding to the additional-layer modulation, a ratio of a modulation order of the base-layer modulation to the modulation order of the additional-layer modulation is equal to a ratio of a TBS index value corresponding to the base-layer modulation to the TBS index value corresponding to the additional-layer modulation; or a product of a ratio of a modulation order of the base-layer modulation to the modulation order of the additional-layer modulation and a ratio of an encoding rate of the base-layer modulation to an encoding rate of the additional-layer modulation is equal to a ratio of a TBS index value corresponding to the base-layer modulation to the TBS index value corresponding to the additional-layer modulation.

Optionally, in a case of this kind of modulation configuration information, the modulation configuration information further includes:

a ratio of a transmit power of a pilot signal to the transmit power of the hierarchical modulation signal; or a ratio of a transmit power of a pilot signal to each of the transmit power of the base-layer modulation signal and the transmit power of the additional-layer modulation signal; or a ratio of a transmit power of a pilot signal to the transmit power of the base-layer modulation signal.

In a second kind, the modulation configuration information further includes a modulation and coding scheme MCS index, different MCS indexes correspond to different MCS configuration information, and the MCS configuration information includes:

a modulation order of the modulation at either layer in the hierarchical modulation, and a transport block size TBS index value corresponding to the modulation at either layer; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

Optionally, in a case of this kind of modulation configuration information, the modulation configuration information further includes:

a ratio of a transmit power of a pilot signal to the transmit power of the hierarchical modulation signal; or a ratio of a transmit power of a pilot signal to each of the transmit power of the base-layer modulation signal and the transmit power of the additional-layer modulation signal; or a ratio of a transmit power of a pilot signal to the transmit power of the base-layer modulation signal.

In a third kind, the modulation configuration information further includes a modulation and coding scheme MCS index, different MCS indexes correspond to different MCS configuration information, and the MCS configuration information includes:

a modulation order of the base-layer modulation; and a transport block size TBS index value corresponding to the base-layer modulation.

Optionally, in a case of this kind of modulation configuration information, the modulation configuration information further includes:

a ratio of a transmit power of a pilot signal to the transmit power of the base-layer modulation signal.

Figure 5:
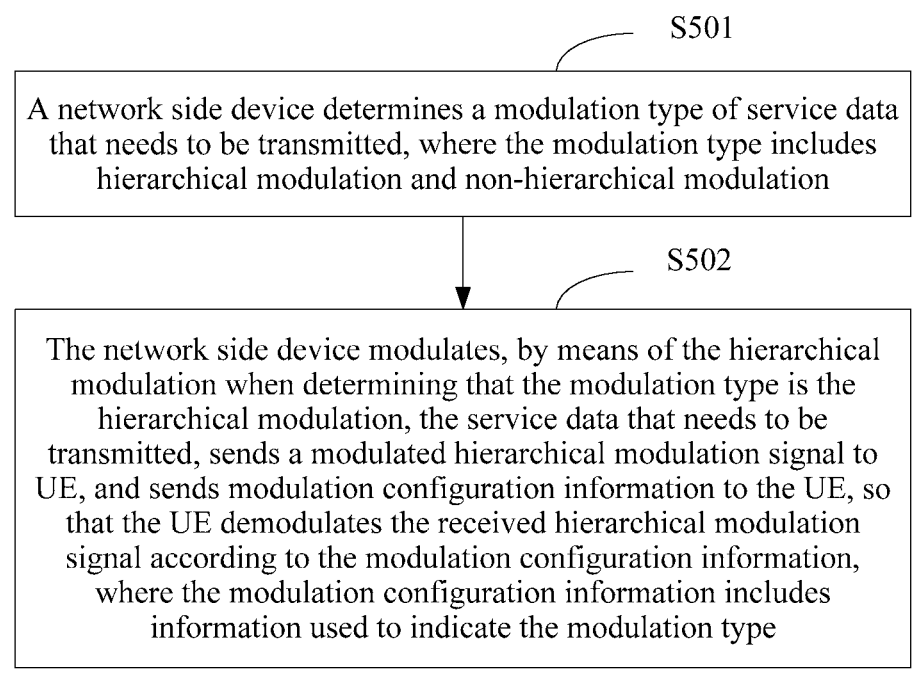
FIG. 5 is a flowchart of a signal transmission method according to Embodiment 5 of the present invention.

As shown in FIG. 5, FIG. 5 is a flowchart of a signal transmission method according to Embodiment 5 of the present invention, and the method includes the following steps:

S501: A network side device determines a modulation type of service data that needs to be transmitted, where the modulation type includes hierarchical modulation and non-hierarchical modulation.

S502: The network side device modulates, by means of the hierarchical modulation when determining that the modulation type is the hierarchical modulation, the service data that needs to be transmitted, sends a modulated hierarchical modulation signal to UE, and sends modulation configuration information to the UE, so that the UE demodulates the received hierarchical modulation signal according to the modulation configuration information, where the modulation configuration information includes information used to indicate the modulation type.

It should be noted that the network side device may send the hierarchical modulation signal and the modulation configuration information at the same time, or may send the hierarchical modulation signal after sending the modulation configuration information. An execution sequence of the two is not limited in this embodiment of the present invention.

In this embodiment of the present invention, the network side device may be specifically an evolved Node B (eNB) in an LTE system. For the service data that needs to be transmitted, the network side device determines the modulation type that needs to be used. The modulation type may be the non-hierarchical modulation (that is, a single modulation scheme) or the hierarchical modulation. Optionally, for the modulation type of hierarchical modulation, the service data transmitted by the network side device includes base-layer data and additional-layer data, and a priority of the base-layer data is higher than a priority of the additional-layer data (that is, a protection degree required by the base-layer data is greater than a protection degree required by the additional-layer data). The hierarchical modulation includes base-layer modulation and additional-layer modulation, where the base-layer modulation is modulation performed on the base-layer data in the service data, and the additional-layer modulation is modulation performed on the additional-layer data in the service data, that is, a priority of a base-layer modulation signal is greater than a priority of an additional-layer modulation signal.

Figure 6:
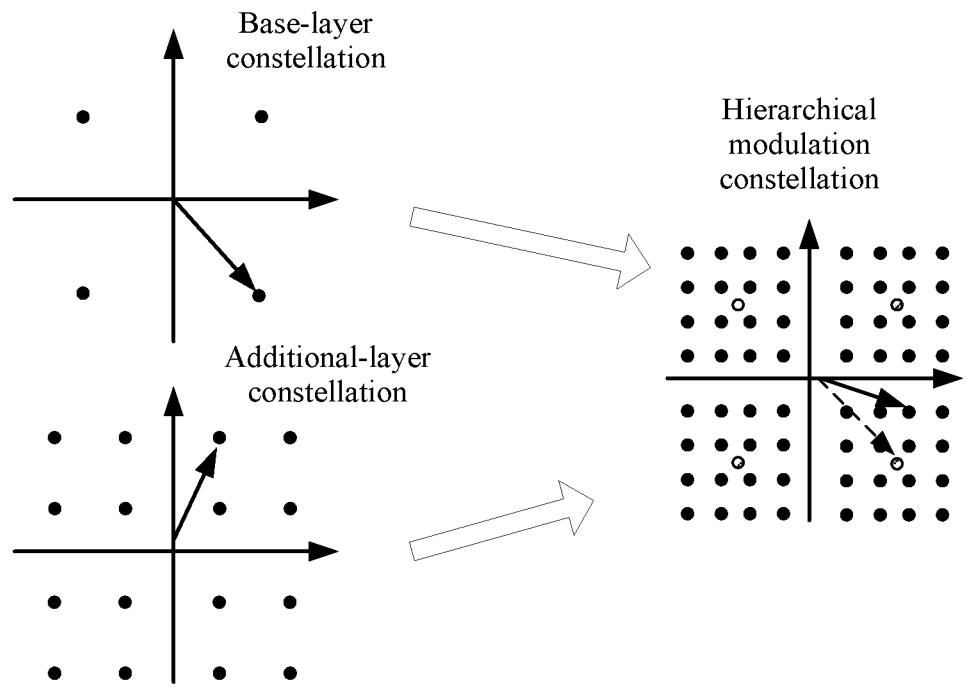
FIG. 6 is a schematic constellation diagram of hierarchical modulation.

Specifically, for a same MBMS service, if the network side device needs to provide business services with different quality for different UEs within a cell, a hierarchical modulation scheme may be used. For example, when providing an MBMS video service for UE within the cell, to meet a requirement that both cell-center UE and cell-edge UE can watch a video, and a requirement that a high-definition video can also be provided for the cell-center UE or UE with a relatively good channel condition, the network side device may determine to modulate, by using the hierarchical modulation scheme, ordinary video data and complementary video data that is corresponding to the high-definition video. Specifically, the ordinary video data may be modulated by means of the base-layer modulation (such as QPSK) in the hierarchical modulation, and the complementary video data may be modulated by means of the additional-layer modulation (such as 16QAM) in the hierarchical modulation. As shown in FIG. 6, FIG. 6 is a schematic constellation diagram of hierarchical modulation. It can be learned from the figure that a 64QAM-based hierarchical modulation constellation may be obtained after combining a QPSK-based base-layer constellation and a 16QAM-based additional-layer constellation. In this way, cell-edge UE or UE with a relatively poor channel condition may obtain the ordinary video data from the received hierarchical modulation signal by means of demodulation, and watch an ordinary video by using the ordinary video data. Cell-center UE or UE with a relatively good channel condition can not only obtain the ordinary video data from the received hierarchical modulation signal by means of demodulation, but also obtain the complementary video data by means of demodulation, and watch the high-definition video by using the two kinds of video data.

In specific implementation, if the network side device needs to provide MBMS services with same quality of service for all UEs within a cell, the network side device may select to use the non-hierarchical modulation, that is, the single modulation scheme.

In specific implementation, when providing unicast service data for different UEs, the network side device may select to use the hierarchical modulation scheme. Specifically, the network side device may separately use the base-layer modulation and the additional-layer modulation to modulate the unicast service data sent to different UEs. For unicast service data sent to the cell-edge UE or the UE with the relatively poor channel condition, the base-layer modulation may be used to ensure data transmission robustness. For the unicast service data sent to the cell-center UE or the UE with the relatively good channel condition, the additional-layer modulation may be used to improve data transmission efficiency. In this way, each UE not only can obtain base-layer or additional-layer unicast service data of the UE from the received hierarchical modulation signal by means of demodulation, but also can improve a system throughput and spectrum utilization efficiency.

In addition to the modulation type, to correctly demodulate the received hierarchical modulation signal, the UE needs to determine various modulation parameter values corresponding to the hierarchical modulation signal, such as a modulation order of the modulation at either layer (different modulation orders correspond to different modulation schemes), a transport block size (TBS) index value, a power of a modulation signal at either layer, and an encoding rate.

In this embodiment of the present invention, the foregoing other modulation parameter values except the modulation type may be predefined on a UE side, or the other modulation parameter values may be notified to the UE by using any one of the following three configuration manners. The three configuration manners provided in the following embodiment of the present invention respectively include: notifying the UE of a modulation parameter value corresponding to the hierarchical modulation or corresponding to the additional-layer modulation; notifying the UE of a modulation parameter value corresponding to the modulation at either layer; and notifying the UE of a modulation parameter value corresponding to the base-layer modulation. The following describes the three configuration manners one by one.

In the first manner, the UE is notified of the modulation parameter value corresponding to the hierarchical modulation or corresponding to the additional-layer modulation.

Specifically, in addition to the modulation type, the modulation configuration information further includes an MCS index, different MCS indexes correspond to different MCS configuration information, and the MCS configuration information includes:

either of a total modulation order of the hierarchical modulation and a modulation order of the additional-layer modulation;

either of a total transport block size TBS index value corresponding to the hierarchical modulation and a TBS index value corresponding to the additional-layer modulation; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

In this configuration manner, a correspondence between a total modulation order of hierarchical modulation and a modulation order of the modulation at either layer may be predefined, or a modulation order of the base-layer modulation may be predefined, or may be notified to the UE by using other existing signaling. Herein, different modulation orders correspond to different modulation schemes. For example, a modulation order 2 corresponds to a QPSK modulation scheme, a modulation order 4 corresponds to a 16QAM modulation scheme, and a modulation order 6 corresponds to a 64QAM modulation scheme. In addition, a TBS index value corresponding to the base-layer modulation may be predefined, or may be notified to the UE by using other existing signaling. Different TBS index values correspond to different TBSs. After determining the modulation order at either layer and the TBS index value, the UE may determine an encoding rate of the modulation signal at either layer according to the modulation order at either layer, the TBS index value, and other known system parameter. In addition to the modulation order, the TBS index, and the encoding rate, the ratio (which is collectively referred to as a ratio ca in the following) in the foregoing configuration is also a necessary parameter used for the UE to demodulate the hierarchical modulation signal. In addition, a transmit power value of the modulation signal at either layer may be predefined, or may be notified to the UE by using other existing signaling. Alternatively, a transmit power value of the base-layer modulation signal or of the additional-layer modulation signal may be predefined, or may be notified to the UE by using other existing signaling, and the foregoing modulation configuration information includes any one of the foregoing power ratios (that is, the ratio ca is the ratio of the transmit power of the base-layer modulation signal to the transmit power of the hierarchical modulation signal, or the ratio of the transmit power of the additional-layer modulation signal to the transmit power of the hierarchical modulation signal, or the ratio of the transmit power of the base-layer modulation signal to the transmit power of the additional-layer modulation signal). Alternatively, one of the following information may be added to the foregoing modulation configuration information (a transmit power of a pilot signal is known in the following information):

a ratio of the transmit power of the pilot signal to the transmit power of the hierarchical modulation signal; or a ratio of the transmit power of the pilot signal to each of the transmit power of the base-layer modulation signal and the transmit power of the additional-layer modulation signal; or a ratio of the transmit power of the pilot signal to the transmit power of the base-layer modulation signal.

In the foregoing modulation configuration information, if acquiring the total modulation order of the hierarchical modulation, the UE may determine the modulation order of the modulation at either layer according to the total modulation order and the predefined correspondence between a total modulation order and a modulation order of the modulation at either layer, or may determine the modulation order of the additional-layer modulation according to the total modulation order and the modulation order that is of the base-layer modulation and that is acquired by using the other existing signaling or predefined.

If acquiring the total TBS index value corresponding to the hierarchical modulation, the UE may determine the TBS index value corresponding to the additional-layer modulation according to the total TBS index value and the TBS index value that is corresponding to the base-layer modulation and that is acquired by using the other existing signaling or predefined.

If acquiring the total TBS index value corresponding to the hierarchical modulation, the UE may further determine the TBS index value corresponding to the modulation at either layer according to a predefined correspondence between a ratio of TBS index values corresponding to modulation at both layers and a ratio of modulation orders corresponding to modulation at both layers. If acquiring the TBS index value corresponding to the additional-layer modulation, the UE may also determine the TBS index value corresponding to the base-layer modulation according to the correspondence. The correspondence may be:

a ratio of the modulation order of the base-layer modulation to the modulation order of the additional-layer modulation is equal to a ratio of the TBS index value corresponding to the base-layer modulation to the TBS index value corresponding to the additional-layer modulation; or a product of a ratio of the modulation order of the base-layer modulation to the modulation order of the additional-layer modulation and a ratio of an encoding rate of the base-layer modulation to an encoding rate of the additional-layer modulation is equal to a ratio of the TBS index value corresponding to the base-layer modulation to the TBS index value corresponding to the additional-layer modulation.

That is, after the UE acquires the total TBS index value corresponding to the hierarchical modulation, TBS index values respectively corresponding to the base-layer modulation and the additional-layer modulation may be determined according to the following formula; or after the UE acquires the TBS index value corresponding to the additional-layer modulation, the TBS index value corresponding to the base-layer modulation may be determined according to the following formula. If the base-layer modulation signal and the additional-layer modulation signal have a same encoding rate, the formula is as follows:

$$\frac{TBS_B}{TBS_E} = \frac{N_B}{N_E},$$

where $TBS_B$ is the TBS index value corresponding to the base-layer modulation, $TBS_E$ is the TBS index value corresponding to the additional-layer modulation, $N_B$ is the modulation order of the base-layer modulation, and $N_E$ is the modulation order of the additional-layer modulation.

If the base-layer modulation signal and the additional-layer modulation signal have different encoding rates, the formula is as follows:

$$\frac{TBS_B}{TBS_E} = \frac{V_B}{V_E} \times \frac{N_B}{N_E},$$

where $V_B$ is the encoding rate of the base-layer modulation signal, $V_E$ is the encoding rate of the additional-layer modulation signal, and a ratio of the encoding rate of the base-layer modulation signal to the encoding rate of the additional-layer modulation signal may be predefined.

By using a specific example, the following describes how the UE demodulates the received hierarchical modulation signal in the foregoing configuration manner.

For example, in addition to the modulation type, the modulation configuration information received by the UE further includes an MCS index. MCS configuration information that corresponds to the MCS index and that is queried by the UE from a stored correspondence between an MCS index and MCS configuration information includes: the total modulation order of the hierarchical modulation, the total transport block size TBS index value corresponding to the hierarchical modulation, the ratio (ratio α) of the transmit power of the base-layer modulation signal to the transmit power of the hierarchical modulation signal, and the ratio of the transmit power of the pilot signal to the transmit power of the base-layer modulation signal.

Therefore, the UE determines a modulation order of the modulation at either layer according to the predefined correspondence between a total modulation order of hierarchical modulation and a modulation order of the modulation at either layer, and a queried total modulation order that is of the hierarchical modulation and that is corresponding to the MCS index. The UE determines a TBS index value corresponding to the modulation at either layer according to the predefined TBS index value corresponding to the base-layer modulation and the total TBS index value that is of the hierarchical modulation and that is corresponding to the MCS index. The UE determines an encoding rate of a modulation signal at either layer according to the modulation order at either layer, the TBS index values, and another known system parameter. The UE determines the transmit power of the base-layer modulation signal according to the known transmit power of the pilot signal, and the ratio that is of the transmit power of the pilot signal to the transmit power of the base-layer modulation signal and that is corresponding to the MCS index. The UE determines the transmit power of the additional-layer modulation signal according to the ratio that is of the transmit power of the base-layer modulation signal to the transmit power of the hierarchical modulation signal and that is corresponding to the MCS index, and the determined transmit power of the base-layer modulation signal. Finally, the UE demodulates the received hierarchical modulation signal according to the determined modulation order of the modulation at either layer, the determined TBS index value corresponding to the modulation at either layer, the determined ratio α, the determined encoding rate of the modulation signal at either layer, and the determined transmit power of the modulation signal at either layer.

By using the foregoing first configuration manner, the network side device does not need to notify the UE of parameter values such as the modulation order and the TBS index value of the base-layer modulation, which may save signaling overheads.

In the second manner, the UE is notified of the modulation parameter value corresponding to the modulation at either layer.

Specifically, the modulation configuration information further includes an MCS index, different MCS indexes correspond to different MCS configuration information, and the MCS configuration information includes:

a modulation order of the modulation at either layer in the hierarchical modulation, and a TBS index value corresponding to the modulation at either layer; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

In this implementation manner, the network side device notifies the UE of the modulation order and the TBS index value that correspond to the modulation at either layer. In this separate configuration manner, parameter configuration becomes more flexible, and data processing on the UE side becomes less complex. In this implementation manner, a transmit power value of the modulation signal at either layer may be predefined, or may be notified to the UE by using other existing signaling. Alternatively, a transmit power value of the base-layer modulation signal or of the additional-layer modulation signal may be predefined, or may be notified to the UE by using other existing signaling, and the foregoing modulation configuration information includes any one of the foregoing power ratios (that is, the ratio ca is the ratio of the transmit power of the base-layer modulation signal to the transmit power of the hierarchical modulation signal, or the ratio of the transmit power of the additional-layer modulation signal to the transmit power of the hierarchical modulation signal, or the ratio of the transmit power of the base-layer modulation signal to the transmit power of the additional-layer modulation signal). Alternatively, one of the following information may be added to the foregoing modulation configuration information (a transmit power of a pilot signal is known in the following information):

a ratio of the transmit power of the pilot signal to the transmit power of the hierarchical modulation signal; or a ratio of the transmit power of the pilot signal to each of the transmit power of the base-layer modulation signal and the transmit power of the additional-layer modulation signal; or a ratio of the transmit power of the pilot signal to the transmit power of the base-layer modulation signal.

By using a specific example, the following describes how the UE demodulates the received hierarchical modulation signal in the foregoing configuration manner.

For example, in addition to the modulation type, the modulation configuration information received by the UE further includes an MCS index. MCS configuration information that corresponds to the MCS index and that is queried by the UE from a stored correspondence between an MCS index and MCS configuration information includes: the modulation order of the modulation at either layer, the TBS index value corresponding to the modulation at either layer, the ratio (ratio ca) of the transmit power of the base-layer modulation signal to the transmit power of the hierarchical modulation signal, and the ratio of the transmit power of the pilot signal to the transmit power of the base-layer modulation signal.

Therefore, the UE determines an encoding rate of the modulation signal at either layer according to the modulation order at either layer, the TBS index value, and another known system parameter. The UE determines the transmit power of the base-layer modulation signal according to the known transmit power of the pilot signal, and the ratio that is of the transmit power of the pilot signal to the transmit power of the base-layer modulation signal and that is corresponding to the MCS index. The UE determines the transmit power of the additional-layer modulation signal according to the ratio that is of the transmit power of the base-layer modulation signal to the transmit power of the hierarchical modulation signal and that is corresponding to the MCS index, and the determined transmit power of the base-layer modulation signal. Finally, the UE demodulates the received hierarchical modulation signal according to the determined modulation order of the modulation at either layer, the determined TBS index value corresponding to the modulation at either layer, the determined ratio $\alpha$, the determined encoding rate of the modulation signal at either layer, and the determined transmit power of the modulation signal at either layer.

In the third manner, the UE is notified of the modulation parameter value corresponding to the base-layer modulation.

Specifically, the modulation configuration information further includes an MCS index, different MCS indexes correspond to different MCS configuration information, and the MCS configuration information includes:

a modulation order of the base-layer modulation; and
a TBS index value corresponding to the base-layer modulation.

In this implementation manner, only the modulation order and the TBS index value that correspond to the base-layer modulation are notified to the UE. A modulation order corresponding to the additional-layer modulation, a TBS index value, and the ratio $\alpha$ are predefined. An encoding rate of the additional-layer modulation signal may also be predefined, or it is stipulated in advance that an encoding rate of the additional-layer modulation signal and an encoding rate of the base-layer modulation signal are the same.

In this implementation manner, a transmit power value of the base-layer modulation signal may be predefined, or may be notified in the foregoing modulation configuration information. A specific notification manner may be implicit notification.

Optionally, the modulation configuration information further includes a ratio of a transmit power of a pilot signal to the transmit power of the base-layer modulation signal.

Herein, the transmit power of the pilot signal is predefined. Correspondingly, a transmit power value of the additional-layer modulation signal may also be predefined, or the foregoing ratio ca is a power ratio (the ratio of the transmit power of the base-layer modulation signal to the transmit power of the hierarchical modulation signal, or the ratio of the transmit power of the additional-layer modulation signal to the transmit power of the hierarchical modulation signal, or the ratio of the transmit power of the base-layer modulation signal to the transmit power of the additional-layer modulation signal). In this way, the transmit power value of the additional-layer modulation signal may be determined according to the transmit power value of the base-layer modulation signal.

By using a specific example, the following describes how the UE demodulates the received hierarchical modulation signal in the foregoing configuration manner:

For example, in addition to the modulation type, the modulation configuration information received by the UE further includes an MCS index. MCS configuration information that corresponds to the MCS index and that is queried by the UE from a stored correspondence between an MCS index and MCS configuration information includes: the modulation order of the base-layer modulation, the TBS index value corresponding to the base-layer modulation, and the ratio of the transmit power of the pilot signal to the transmit power of the base-layer modulation signal.

Therefore, the UE determines the transmit power of the base-layer modulation signal according to the known transmit power of the pilot signal, and the ratio that is of the transmit power of the pilot signal to the transmit power of the base-layer modulation signal and that is corresponding to the MCS index. The UE determines the transmit power of the additional-layer modulation signal according to the predefined ratio (ratio α) of the transmit power of the base-layer modulation signal to the transmit power of the additional-layer modulation signal, and the determined transmit power of the base-layer modulation signal. The UE determines the encoding rate of the base-layer modulation signal according to the modulation order that is of the base-layer modulation and that is corresponding to the MCS index, the TBS index value corresponding to the base-layer modulation, and another known system parameter. The UE determines the encoding rate of the additional-layer modulation signal according to the predefined modulation order of the additional-layer modulation, the TBS index value corresponding to the additional-layer modulation, and another known system parameter. Finally, the UE demodulates the received hierarchical modulation signal according to the modulation order that is of the base-layer modulation and that is corresponding to the MCS index, the TBS index value corresponding to the base-layer modulation, the predefined modulation order of the additional-layer modulation, the TBS index value corresponding to the additional-layer modulation, the ratio α, and the determined transmit power and the determined encoding rate that are of the modulation signal at either layer.

In this implementation manner, for all UEs within a cell, only the modulation order and the TBS index value that are of the base-layer modulation may be notified, which reduces data processing complexity for UE that does not support the hierarchical modulation.

Optionally, in S501, the service data is MBMS data.

The determining a modulation type of service data that needs to be transmitted includes determining, when a multicast control channel MCCH and a multicast traffic channel MTCH need to be transmitted on a same subframe, that the modulation type is the hierarchical modulation, and the modulating, by means of the hierarchical modulation when it is determined that the modulation type is the hierarchical modulation, the service data that needs to be transmitted includes modulating, by using the modulation configuration information used during MCCH modulation, the MBMS data that needs to be transmitted on the MTCH; or the determining a modulation type of service data that needs to be transmitted includes determining, when a multicast control channel MCCH and a multicast traffic channel MTCH need to be transmitted on a same subframe, that the modulation type is the non-hierarchical modulation; and after it is determined that the modulation type is the non-hierarchical modulation, the determining a modulation type of service data that needs to be transmitted further includes modulating, by using the modulation configuration information used during MCCH modulation, the MBMS data that needs to be transmitted on the MTCH.

In a specific implementation process, if the network side device needs to simultaneously transmit the MCCH and the MTCH on the same subframe, the modulation configuration information used during MCCH modulation needs to be used to modulate the MBMS data that needs to be transmitted on the MTCH. Correspondingly, when the UE simultaneously receives the MCCH and the MTCH on the same subframe, the modulation configuration information used during MCCH demodulation is used to demodulate the MBMS data received on the MTCH. The modulation configuration information herein is notified in a system information block (SIB) 13. When the modulation scheme used during the MCCH modulation is the non-hierarchical modulation, that is, the signal modulation scheme, the MBMS data transmitted on the MTCH needs to be modulated by using the single modulation scheme. In this case, the MBMS data modulated by using the single modulation scheme may include only base-layer data, or may include both base-layer data and additional-layer data.

Base on a same invention conception, the following embodiment of the present invention further provides a signal transmission method based on a UE side. Specific implementation is similar to the steps in the foregoing embodiment, and no repeated description is provided.

Figure 7:
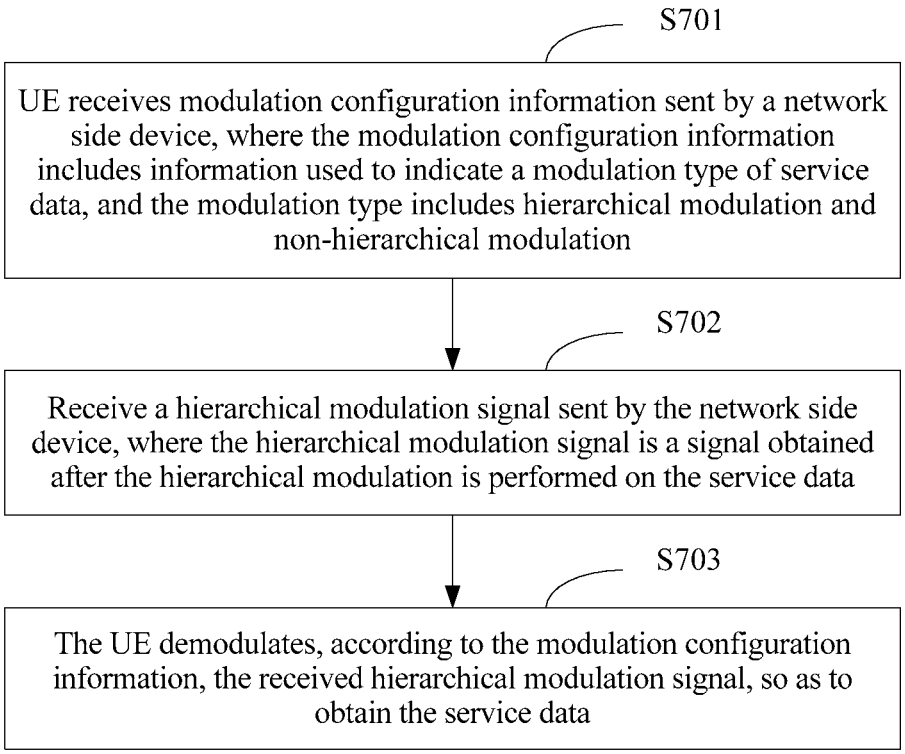
FIG. 7 is a flowchart of a signal transmission method according to Embodiment 6 of the present invention.

As shown in FIG. 7, FIG. 7 is a flowchart of a signal transmission method according to Embodiment 6 of the present invention, and the method includes the following steps:

S701: UE receives modulation configuration information sent by a network side device, where the modulation configuration information includes information used to indicate a modulation type of service data, and the modulation type includes hierarchical modulation and non-hierarchical modulation.

S702: Receive a hierarchical modulation signal sent by the network side device, where the hierarchical modulation signal is a signal obtained after the hierarchical modulation is performed on the service data.

Herein, an execution sequence of step S302 and step S301 is not limited in this embodiment of the present invention. The UE may receive the hierarchical modulation signal and the modulation configuration information at the same time, or may receive the hierarchical modulation signal after receiving the modulation configuration information.

S703: The UE demodulates the received hierarchical modulation signal according to the modulation configuration information, so as to obtain the service data.

Optionally, the service data includes base-layer data and additional-layer data, and a priority of the base-layer data is higher than a priority of the additional-layer data.

The hierarchical modulation includes base-layer modulation and additional-layer modulation, where the base-layer modulation is modulation performed on the base-layer data in the service data, and the additional-layer modulation is modulation performed on the additional-layer data in the service data.

In addition to the modulation type, to correctly demodulate the received hierarchical modulation signal, the UE needs to determine various modulation parameter values corresponding to the hierarchical modulation signal. This embodiment of the present invention provides three configuration manners for the modulation parameter values. The UE may determine, according to any one of the three manners, various modulation parameter values for demodulating the hierarchical modulation signal.

In a first manner, the modulation configuration information includes a modulation parameter value corresponding to the hierarchical modulation or corresponding to the additional-layer modulation.

Specifically, the modulation configuration information further includes an MCS index, different MCS indexes correspond to different MCS configuration information, and the MCS configuration information includes:

either of a total modulation order of the hierarchical modulation and a modulation order corresponding to the additional-layer modulation;

either of a total transport block size TBS index value corresponding to the hierarchical modulation and a TBS index value corresponding to the additional-layer modulation; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

Optionally, the modulation configuration information further includes:

a ratio of a transmit power of a pilot signal to the transmit power of the hierarchical modulation signal; or a ratio of a transmit power of a pilot signal to each of the transmit power of the base-layer modulation signal and the transmit power of the additional-layer modulation signal; or a ratio of a transmit power of a pilot signal to the transmit power of the base-layer modulation signal.

Optionally, if the modulation configuration information includes the total TBS index value corresponding to the hierarchical modulation, or the TBS index value corresponding to the additional-layer modulation, a ratio of a modulation order of the base-layer modulation to the modulation order of the additional-layer modulation is equal to a ratio of a TBS index value corresponding to the base-layer modulation to the TBS index value corresponding to the additional-layer modulation; or a product of a ratio of a modulation order of the base-layer modulation to the modulation order of the additional-layer modulation and a ratio of an encoding rate of the base-layer modulation to an encoding rate of the additional-layer modulation is equal to a ratio of a TBS index value corresponding to the base-layer modulation to the TBS index value corresponding to the additional-layer modulation.

In a second manner, the modulation configuration information includes a modulation parameter value corresponding to modulation at either layer.

Specifically, the modulation configuration information further includes an MCS index, different MCS indexes correspond to different MCS configuration information, and the MCS configuration information includes:

a modulation order of the modulation at either layer in the hierarchical modulation, and a TBS index value corresponding to the modulation at either layer; and any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of a transmit power of a base-layer modulation signal to a transmit power of the hierarchical modulation signal, a ratio of a transmit power of an additional-layer modulation signal to a transmit power of the hierarchical modulation signal, or a ratio of a transmit power of a base-layer modulation signal to a transmit power of an additional-layer modulation signal.

Optionally, the modulation configuration information further includes:

a ratio of a transmit power of a pilot signal to the transmit power of the hierarchical modulation signal; or a ratio of a transmit power of a pilot signal to each of the transmit power of the base-layer modulation signal and the transmit power of the additional-layer modulation signal; or a ratio of a transmit power of a pilot signal to the transmit power of the base-layer modulation signal.

In a third manner, the modulation configuration information includes a modulation parameter value corresponding to the base-layer modulation.

Specifically, the modulation configuration information further includes an MCS index, different MCS indexes correspond to different MCS configuration information, and the MCS configuration information includes:

a modulation order of the base-layer modulation; and a TBS index value corresponding to the base-layer modulation.

Optionally, the modulation configuration information further includes:

a ratio of a transmit power of a pilot signal to the transmit power of the base-layer modulation signal.

Optionally, in step S702, the service data is MBMS data. The method further includes demodulating, when the UE simultaneously receives a multicast control channel MCCH and a multicast traffic channel MTCH on a same subframe and by using the modulation configuration information used during MCCH demodulation, the MBMS data received on the MTCH. The MBMS data is base-layer data, or the MBMS data is base-layer data and additional-layer data.

It may be clearly understood by a person skilled in the art that, for a purpose of convenient and brief description, only the foregoing functional module division is used as an example for description. In an actual application, the foregoing functions are assigned to different functional modules for implementation as required, that is, an inner structure of the apparatus is divided into different functional modules to implement all or some of the functions described above. For a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely used for describing the technical solutions in the present application in detail. However, the descriptions of the foregoing embodiments are merely intended to help understand the methods and core ideas of the present invention, but shall not be construed as a limitation to the present invention. Any variation or replacement readily figured out by a person skilled in the art within the technical scope disclosed in the present invention shall fall within the protection scope of the present invention.

What is claimed is:

1. A signal transmission method, comprising:
  receiving, by a user equipment (UE), modulation configuration information from a network side device so as to save signaling overheads by avoiding being notified of a modulation order of a base-layer modulation and a transport block size (TBS) index value of the base-layer modulation, wherein the modulation configuration information indicates a modulation type of service data, and the modulation type comprises hierarchical modulation and non-hierarchical modulation;
  receiving, by the UE, a hierarchical modulation signal from the network side device, wherein the hierarchical modulation signal is a signal obtained after the hierarchical modulation is performed on the service data; and
  demodulating, by the UE according to the received modulation configuration information, the hierarchical modulation signal;
  wherein the service data comprises base-layer data and additional-layer data, and a priority of the base-layer data is higher than a priority of the additional-layer data; and the hierarchical modulation comprises base-layer modulation and additional-layer modulation, wherein the base-layer modulation is modulation performed on the base-layer data in the service data, and the additional-layer modulation is modulation performed on the additional-layer data in the service data;
  wherein the modulation configuration information comprises a modulation and coding scheme (MCS) index, different MCS indexes correspond to different MCS configuration information, and the MCS configuration information comprises any one of the following four ratios:
  (a) a ratio of a base-layer constellation point spacing to a hierarchical modulation constellation point spacing,
  (b) a ratio of an additional-layer constellation point spacing to the hierarchical modulation constellation point spacing,
  (c) a ratio of transmit power of a base-layer modulation signal to transmit power of the hierarchical modulation signal, and
  (d) a ratio of transmit power of an additional-layer modulation signal to transmit power of the hierarchical modulation signal.

2. The method according to claim 1, wherein the MCS configuration information further comprises:
  either of a total modulation order of the hierarchical modulation and a modulation order corresponding to the additional-layer modulation;
  either of a total transport block size (TBS) index value corresponding to the hierarchical modulation and a TBS index value corresponding to the additional-layer modulation.

3. The method according to claim 2, wherein when the modulation configuration information comprises either of the total TBS index value corresponding to the hierarchical modulation and the TBS index value corresponding to the additional-layer modulation, a ratio of the modulation order of the base-layer modulation to the modulation order of the additional-layer modulation is equal to a ratio of the TBS index value corresponding to the base-layer modulation to the TBS index value corresponding to the additional-layer modulation; or
  a product of a ratio of the modulation order of the base-layer modulation to the modulation order of the additional-layer modulation and a ratio of an encoding rate of the base-layer modulation to an encoding rate of the additional-layer modulation is equal to a ratio of the TBS index value corresponding to the base-layer modulation to the TBS index value corresponding to the additional-layer modulation.

4. The method according to claim 2, wherein the modulation configuration information further comprises:
  a ratio of transmit power of a pilot signal to the transmit power of the hierarchical modulation signal.

5. The method according to claim 2, wherein the modulation configuration information further comprises:
  a ratio of transmit power of a pilot signal to each of the transmit power of the base-layer modulation signal and the transmit power of the additional-layer modulation signal.

6. The method according to claim 2, wherein the modulation configuration information further comprises:
  a ratio of transmit power of a pilot signal to the transmit power of the base-layer modulation signal.

7. The method according to claim 1, wherein the MCS configuration information further comprises:
  a modulation order of the modulation at either layer in the hierarchical modulation, and a transport block size (TBS) index value corresponding to the modulation at either layer in the hierarchical modulation.

8. A non-transitory computer-readable medium, comprising computer-executable instructions which when executed by a computer cause the computer to implement operations including:
  receiving modulation configuration information from a network side device so as to save signaling overheads by avoiding being notified of a modulation order of a base-layer modulation and a transport block size (TBS) index value of the base-layer modulation, wherein the modulation configuration information indicates a modulation type of service data, and the modulation type comprises hierarchical modulation and non-hierarchical modulation;

receiving a hierarchical modulation signal from the network side device, wherein the hierarchical modulation signal is a signal obtained after the hierarchical modulation is performed on the service data; and demodulating, according to the received modulation configuration information, the hierarchical modulation signal;

wherein the service data comprises base-layer data and additional-layer data, and a priority of the base-layer data is higher than a priority of the additional-layer data; and the hierarchical modulation comprises base-layer modulation and additional-layer modulation, wherein the base-layer modulation is modulation performed on the base-layer data in the service data, and the additional-layer modulation is modulation performed on the additional-layer data in the service data;

wherein the modulation configuration information comprises a modulation and coding scheme (MCS) index, different MCS indexes correspond to different MCS configuration information, and the MCS configuration information comprises any one of the following four ratios:

(a) a ratio of a base-layer constellation point spacing to a hierarchical modulation constellation point spacing, (b) a ratio of an additional-layer constellation point spacing to the hierarchical modulation constellation point spacing, (c) a ratio of transmit power of a base-layer modulation signal to transmit power of the hierarchical modulation signal, and (d) a ratio of transmit power of an additional-layer modulation signal to transmit power of the hierarchical modulation signal.

9. The non-transitory computer-readable medium according to claim 8, wherein the MCS configuration information further comprises:

either of a total modulation order of the hierarchical modulation and a modulation order corresponding to the additional-layer modulation;

either of a total transport block size (TBS) index value corresponding to the hierarchical modulation and a TBS index value corresponding to the additional-layer modulation.

10. The non-transitory computer-readable medium according to claim 9 wherein when the modulation configuration information comprises either of the total TBS index value corresponding to the hierarchical modulation and the TBS index value corresponding to the additional-layer modulation, a ratio of the modulation order of the base-layer modulation to the modulation order of the additional-layer modulation is equal to a ratio of the TBS index value corresponding to the base-layer modulation to the TBS index value corresponding to the additional-layer modulation; or a product of a ratio of the modulation order of the base-layer modulation to the modulation order of the additional-layer modulation and a ratio of an encoding rate of the base-layer modulation to an encoding rate of the additional-layer modulation is equal to a ratio of the TBS index value corresponding to the base-layer modulation to the TBS index value corresponding to the additional-layer modulation.

11. The non-transitory computer-readable medium according to claim 9, wherein the modulation configuration information further comprises:

a ratio of transmit power of a pilot signal to the transmit power of the hierarchical modulation signal.

12. The non-transitory computer-readable medium according to claim 9, wherein the modulation configuration information further comprises:

a ratio of transmit power of a pilot signal to each of the transmit power of the base-layer modulation signal and the transmit power of the additional-layer modulation signal.

13. The non-transitory computer-readable medium according to claim 9, wherein the modulation configuration information further comprises:

a ratio of transmit power of a pilot signal to the transmit power of the base-layer modulation signal.

14. The non-transitory computer-readable medium according to claim 8, wherein the MCS configuration information further comprises:

a modulation order of the modulation at either layer in the hierarchical modulation, and a transport block size (TBS) index value corresponding to the modulation at either layer in the hierarchical modulation.

15. A non-transitory computer-readable medium, comprising computer-executable instructions which when executed by a computer cause the computer to implement operations including:

determining a modulation type of service data to be transmitted, wherein the modulation type comprises hierarchical modulation and non-hierarchical modulation;

modulating, through the hierarchical modulation when it is determined that the modulation type is the hierarchical modulation, the service data to be transmitted, and sending a modulated hierarchical modulation signal to a user equipment (UE); and sending modulation configuration information to the UE so as to save signaling overheads by avoiding notifying the UE of a modulation order of a base-layer modulation and a transport block size (TBS) index value of the base-layer modulation, wherein the modulation configuration information indicates the determined modulation type, wherein the service data comprises base-layer data and additional-layer data, and a priority of the base-layer data is higher than a priority of the additional-layer data; and the hierarchical modulation comprises base-layer modulation and additional-layer modulation, wherein the base-layer modulation is modulation performed on the base-layer data in the service data, and the additional-layer modulation is modulation performed on the additional-layer data in the service data;

wherein the modulation configuration information comprises a modulation and coding scheme (MCS) index, different MCS indexes correspond to different MCS configuration information, and the MCS configuration information comprises any one of the following four ratios:

(a) a ratio of a base-layer constellation point spacing to a hierarchical modulation constellation point spacing, (b) a ratio of an additional-layer constellation point spacing to the hierarchical modulation constellation point spacing, (c) a ratio of transmit power of a base-layer modulation signal to transmit power of the hierarchical modulation signal, and (d) a ratio of transmit power of an additional-layer modulation signal to transmit power of the hierarchical modulation signal.

16. The non-transitory computer-readable medium according to claim 15, wherein the MCS configuration information further comprises:
- either of a total modulation order of the hierarchical modulation and a modulation order of the additional-layer modulation;
- either of a total transport block size (TBS) index value corresponding to the hierarchical modulation and a TBS index value corresponding to the additional-layer modulation.

17. The non-transitory computer-readable medium according to claim 16, wherein when the modulation configuration information comprises either of the total TBS index value corresponding to the hierarchical modulation and the TBS index value corresponding to the additional-layer modulation,
- a ratio of the modulation order of the base-layer modulation to the modulation order of the additional-layer modulation is equal to a ratio of the TBS index value corresponding to the base-layer modulation to the TBS index value corresponding to the additional-layer modulation; or
- a product of a ratio of the modulation order of the base-layer modulation to the modulation order of the additional-layer modulation and a ratio of an encoding rate of the base-layer modulation to an encoding rate of the additional-layer modulation is equal to a ratio of the TBS index value corresponding to the base-layer modulation to the TBS index value corresponding to the additional-layer modulation.

18. The non-transitory computer-readable medium according to claim 16, wherein the modulation configuration information comprises:
- a ratio of transmit power of a pilot signal to the transmit power of the hierarchical modulation signal;
- a ratio of transmit power of the pilot signal to each of the transmit power of the base-layer modulation signal and the transmit power of the additional-layer modulation signal; or
- a ratio of transmit power of the pilot signal to the transmit power of the base-layer modulation signal.

19. The non-transitory computer-readable medium according to claim 15, wherein the MCS configuration information further comprises:
- a modulation order of the modulation at either layer in the hierarchical modulation, and a transport block size (TBS) index value corresponding to the modulation at either layer in the hierarchical modulation.

20. The non-transitory computer-readable medium according to claim 15, wherein the service data is Multimedia Broadcast Multicast Service (MBMS) data; and the steps further comprises:
- determining, when a multicast control channel (MCCH) and a multicast traffic channel (MTCH) need to be transmitted on a same subframe, that the modulation type is the hierarchical modulation; and
- modulating, by using the modulation configuration information used during MCCH modulation, the MBMS data that needs to be transmitted on the MTCH.

* * * * *

UNITED STATES PATENT AND TRADEMARK OFFICE
CERTIFICATE OF CORRECTION

PATENT NO. : 10,659,927 B2  Page 1 of 1
APPLICATION NO. : 16/227443
DATED : May 19, 2020
INVENTOR(S) : Li It is certified that error appears in the above-identified patent and that said Letters Patent is hereby corrected as shown below:

On the Title Page

Page 2, item (56) Other Publications, Citation 10: "Jacksonville, USA, R1-106034, 3rd Generation Dartnership Project," should read -- Jacksonville, USA, R1-106034, 3rd Generation Partnership Project, --.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*